(12) United States Patent
Bandlamudi et al.

(10) Patent No.: US 9,998,651 B2
(45) Date of Patent: Jun. 12, 2018

(54) IMAGE PROCESSING APPARATUS AND IMAGE PROCESSING METHOD

(71) Applicant: Samsung Electronics Co., Ltd., Suwon-si, Gyeonggi-do (KR)

(72) Inventors: Vamsee Kalyan Bandlamudi, Andhra Pradesh (IN); Karthik Narayanan, Tamil Nadu (IN); Tapan Harishkumar Shah, Gujarat (IN); Somanathan Karthikeyan, Bangalore (IN); Narasimha Gopalakrishna Pai, Bangalore (IN); Santhosh Kumar Banadakoppa Narayanaswamy, Shimoga (IN); Bhupala Srivarma Chiranjeevi, Bangalore (IN)

(73) Assignee: Samsung Electroncis Co., Ltd., Suwon-si (KR)

( * ) Notice: Subject to any disclaimer, the term of this patent is extended or adjusted under 35 U.S.C. 154(b) by 0 days. days.

(21) Appl. No.: 15/192,477

(22) Filed: Jun. 24, 2016

(65) Prior Publication Data

US 2016/0381282 A1    Dec. 29, 2016

(30) Foreign Application Priority Data

Jun. 24, 2015  (IN) ............................ 3179/CHE/2015
Jan. 18, 2016  (IN) ............................ 3179/CHE/2015
Jun. 14, 2016  (KR) ........................ 10-2016-0073836

(51) Int. Cl.
*G02B 13/16*      (2006.01)
*H04N 5/225*      (2006.01)
*H04N 5/232*      (2006.01)
*H04N 5/262*      (2006.01)

(52) U.S. Cl.
CPC ..... *H04N 5/23212* (2013.01); *H04N 5/23216* (2013.01); *H04N 5/23293* (2013.01); *H04N 5/23296* (2013.01); *H04N 5/2628* (2013.01)

(58) Field of Classification Search
CPC ............. H04N 5/23212; H04N 5/2628; H04N 5/23216; H04N 5/232; H04N 5/23296; H04N 5/23293; G06T 7/11
USPC ............................... 348/240.99, 240.2–240.3
See application file for complete search history.

(56) References Cited

U.S. PATENT DOCUMENTS

| | | | |
|---|---|---|---|
| 9,049,423 B2 | 6/2015 | Bi et al. | |
| 2008/0195924 A1* | 8/2008 | Kim | G06F 17/30038 715/200 |
| 2011/0267499 A1 | 11/2011 | Wan et al. | |
| 2011/0267530 A1* | 11/2011 | Chun | G06F 3/04883 348/333.11 |
| 2012/0062693 A1* | 3/2012 | Hada | G02B 7/102 348/36 |
| 2013/0208166 A1 | 8/2013 | Tseng et al. | |
| 2014/0104376 A1 | 4/2014 | Chen | |

(Continued)

*Primary Examiner* — Yogesh Aggarwal
(74) *Attorney, Agent, or Firm* — Jefferson IP Law, LLP

(57) ABSTRACT

An image processing apparatus and an image processing method are provided. The image processing apparatus includes an image capturer configured to capture a plurality of images having different zoom levels, a storage configured to store the plurality of image, a display configured to display a first image among the plurality of images, and a processor configured to control the display to display a second image among the plurality of images based on a control input, the second image having a zoom level different from a zoom level of the first image.

18 Claims, 29 Drawing Sheets

(56) References Cited

U.S. PATENT DOCUMENTS

2015/0009372 A1\* 1/2015 Min .................. H04N 5/247
  348/262
2015/0086127 A1\* 3/2015 Camilus ............... G06T 5/002
  382/264
2015/0163413 A1\* 6/2015 Ikeda ............... H04N 5/23216
  348/240.99
2015/0355780 A1\* 12/2015 Huang ............... G06T 5/003
  345/173

\* cited by examiner

FIG. 3
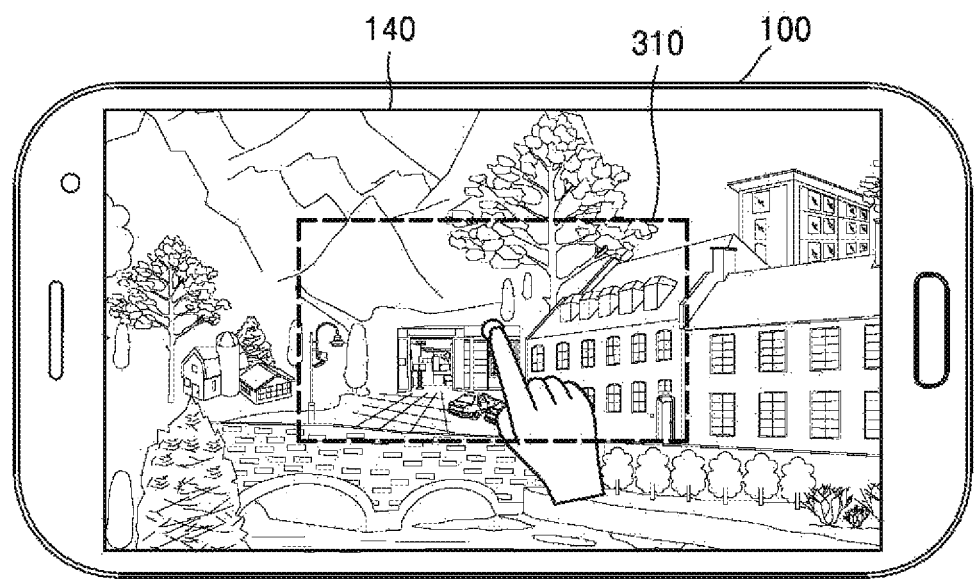
(S302)
(S304)

FIG. 6
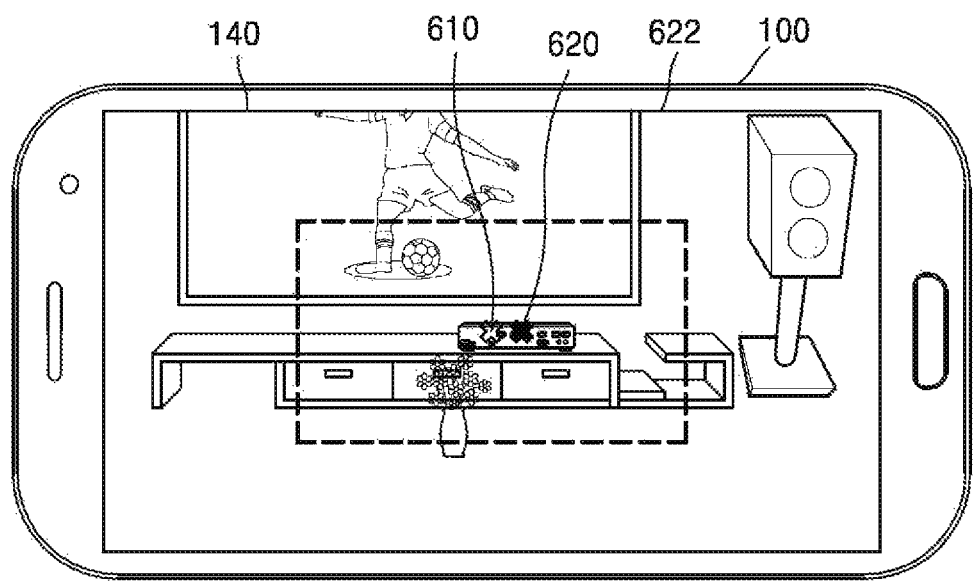
(S602)
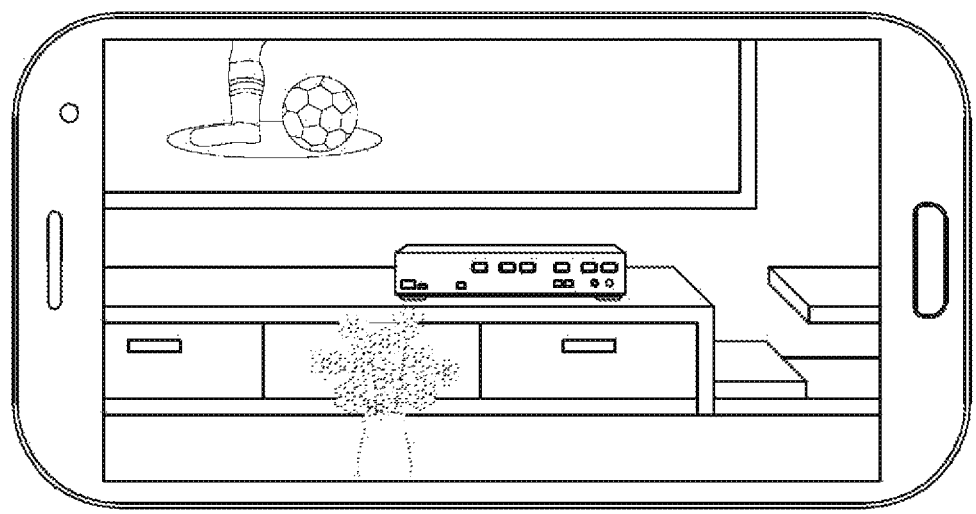
(S604)

IMAGE PROCESSING APPARATUS AND IMAGE PROCESSING METHOD

CROSS-REFERENCE TO RELATED APPLICATION(S)

This application claims the benefit under 35 U.S.C. § 119(a) of an Indian patent application filed on Jun. 24, 2015 in the Indian Patent Office and assigned Serial number 3179/CHE/2015, of an Indian patent application filed on Jan. 18, 2016 in the Indian Patent Office and assigned Serial number 3179/CHE/2015, and of a Korean patent application filed on Jun. 14, 2016 in the Korean Intellectual Property Office and assigned Serial number 10-2016-0073836, the entire disclosure of each of which is hereby incorporated by reference.

TECHNICAL FIELD

The present disclosure relates to an image processing apparatus, an image processing method, and a non-transitory computer-readable recording medium having recorded thereon a program code for performing the image processing method.

BACKGROUND

In order to derive a refocus effect, various technologies have been proposed. For example, in order to derive the refocus effect, special sensors, such as a light field sensor that is not used in a general camera, may be used. However, an additional hardware configuration, such as the light field sensor, incurs additional costs and increases a weight of a product. Furthermore, even though the light field sensor is used, it is impossible to refocus on each of objects on the same focal plane.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a refocusable image by capturing a plurality of images at a plurality of zoom levels, without special sensors, such as a light field sensor.

Another aspect of the present disclosure is to provide improving a focus resolution with respect to objects that seem to be present on the same focal plane because the objects are placed at a long distance.

In accordance with an aspect of the present disclosure, an image processing apparatus is provided. The image processing apparatus includes an image capturer configured to capture a plurality of images having different zoom levels, a storage configured to store the plurality of image, a display configured to display a first image among the plurality of images, and a processor configured to control the display to display a second image among the plurality of images based on a control input, the second image having a zoom level different from a zoom level of the first image.

The processor may be further configured to control the image capturer to capture a plurality of images having different zoom levels, the plurality of images including a region of interest (ROI) determined by a control signal input to the processor.

The processor may be further configured to set at least one ROI based on a focus value of an input image captured by the image capturer, and control the image capturer to zoom in on the at least one ROI and capture at least one image with respect to the at least one ROI.

The processor may be further configured to detect a plurality of objects concluded as a same focal plane from an input image captured by the image capturer, and control the image capturer to zoom in at a first zoom level with respect to an area including the plurality of objects, sequentially focus on the plurality of objects at the first zoom level, and capture a plurality of images having different focuses.

The processor may be further configured to determine an ROI and output guide information that adjusts a field of view (FOV) and place the ROI at a center of the FOV.

The display may be further configured to display a plurality of images having different zoom levels.

The display may be further configured to display the first image having a first zoom level and overlay, on the first image, at least one image having different zoom levels and corresponding to at least one ROI included in the first image.

The display may be further configured to display, on the first image, a mark indicating an FOV of an image having a zoom level different from the zoom level of the first image while the first image is displayed.

The display may be further configured to display, on the first image, a mark indicating information about an image having a focus different from a focus of the first image while the first image is displayed.

The storage may be further configured to store identification information of the plurality of images having the different zoom levels and store at least one selected from among zoom level information, FOV information, and focus information of the plurality of images having the different zoom levels.

In accordance with another aspect of the present disclosure, an image processing method is provided. The image processing method includes capturing a plurality of images having different zoom levels, displaying a first image among the plurality of images, and displaying a second image among the plurality of images based on a control input, the second image having a zoom level different from a zoom level of the first image.

The capturing of the plurality of images may include capturing a plurality of images having different zoom levels with respect to an ROI determined by an input control signal.

The image processing method may further include setting at least one ROI based on a focus value of an input image, wherein the capturing of the plurality of images may include zooming in on the at least one ROI and capturing at least one image with respect to the at least one ROI.

The image processing method may further include detecting a plurality of objects concluded as a same focal plane from an input image, wherein the capturing of the plurality of images may include zooming in at a first zoom level with respect to an area including the plurality of objects, and sequentially focusing on the plurality of objects at the first zoom level and capturing a plurality of images having different focuses.

The image processing method may further include determining an ROI, and outputting guide information that adjusts an FOV and place the ROI at a central portion of the FOV.

The image processing method may further include displaying a plurality of images having different zoom levels.

The displaying of at least one image among the plurality of images may include displaying the first image having a first zoom level, and overlaying, on the first image, at least one image having a different zoom level and corresponding to at least one ROI included in the first image.

The image processing method may further include displaying, on the first image, a mark indicating an FOV of an image having a zoom level different from a zoom level of the first image while the first image is displayed.

In accordance with another aspect of the present disclosure, an image processing apparatus is provided. The image processing apparatus includes an image capturer configured to capture a plurality of images having different zoom levels, a processor configured to generate an image file including refocus information and image data with respect to each of the plurality of image, and a storage configured to store the image file, wherein the refocus information may include information indicating that the corresponding image file is a refocusable image, and a path of a file to be referred to for refocus processing.

In accordance with another aspect of the present disclosure, an image processing apparatus is provided. The image processing apparatus includes a storage configured to store a plurality of images having different zoom levels and refocus information, a display configured to display a first image among the plurality of images, and a processor configured to control, when a control input is received, the display to display a second image based on the refocus information, the second image having a zoom level different from a zoom level of the first image among the plurality of image, wherein the refocus information may include information indicating that the corresponding image file is a refocusable image, and a path of a file to be referred to for refocus processing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram for describing a process of displaying one image among captured images according to an embodiment of the present disclosure;

FIG. 6 is a diagram for describing a user's selection of a region of interest (ROI) according to an embodiment of the present disclosure;

Throughout the drawings, it should be noted that like reference numbers are used to depict the same or similar elements, features, and structures.

DETAILED DESCRIPTION

Figure 1:
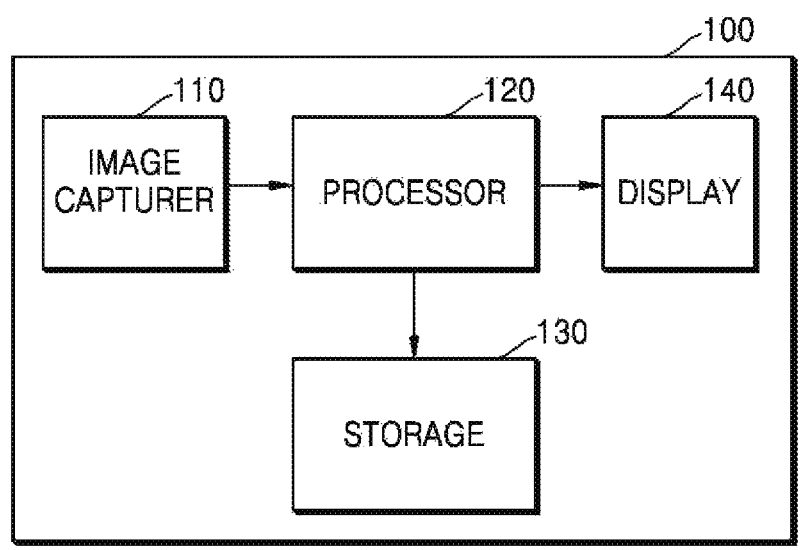
FIG. 1 is a block diagram of an image processing apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present disclosure, the principle of the inventive concept will be described and embodiments will be described, so that the scope of the claims is clarified and the inventive concept can be easily carried out by those of ordinary skill in the art. Embodiments set forth herein may be implemented in various forms.

Like reference numerals are used to refer to like elements throughout the present disclosure and the drawings. The present disclosure does not describe all elements of embodiments, and general descriptions in the art to which the present disclosure pertains and redundant descriptions between embodiments will be omitted. The term "part" or "portion" may be implemented by software or hardware. According to various embodiments of the present disclosure, a plurality of "parts" or "portions" may be implemented by one unit or element, and one "part" or "portion" may include a plurality of components. In addition, it will be understood that although the terms "first", "second", and the like, may be used herein to describe various components, these components should not be limited by these terms. These components are only used to distinguish one component from another.

Hereinafter, the operation principle of the inventive concept and embodiments will be described with reference to the accompanying drawings.

FIG. 1 is a block diagram of an image processing apparatus according to an embodiment of the present disclosure.

Referring to FIG. 1, an image processing apparatus 100 according to the present embodiment may include an image capturer 110, a processor 120, a storage 130, and a display 140. According to an embodiment of the present disclosure, the image processing apparatus 100 may further include a user input part (not illustrated).

According to an embodiment of the present disclosure, the image processing apparatus 100 may be a smartphone, a tablet personal computer (PC), a mobile phone, a camera, a notebook computer, or a personal digital assistant (PDA), but is not limited thereto.

The image capturer 110 may generate image data by capturing a plurality of images having different zoom levels. The plurality of images captured at different zoom levels may be used to generate a refocusable image.

The zoom level may be determined by an optical angle and a focal length. In the case of zoom-in, that is, when the zoom level is increased, the optical angle is narrowed and the focal length is increased. In the case of zoom-out, that is, when the zoom level is lowered, the optical angle is widened and the focal length is shortened.

The image capturer 110 may include a lens, an aperture, and an imaging element. The image capturer 110 may control the lens, the aperture, and the imaging element to capture a plurality of images having different zoom levels according to a control signal input from the processor 120. The image capturer 110 may adjust the zoom level by changing a position of the lens by using a lens driver and adjusting f-number of the aperture. According to an embodiment of the present disclosure, the image capturer 110 may adjust a field of view (FOV) by adjusting an active area that reads a signal from the imaging element. The image capturer 110 may generate a plurality of images having different focuses by capturing images of a plurality of objects while sequentially focusing on the plurality of objects according to a control signal from the processor 120.

According to an embodiment of the present disclosure, the image capturer 110 may continuously capture a plurality of images having different zoom levels in response to a shutter release signal that is input once. At each capturing, a zoom level and an FOV are defined. Information about the zoom level and the FOV may be transferred to the image capturer 110 by the processor 120. According to an embodiment of the present disclosure, the image processing apparatus 100 may define a first mode of capturing a refocusable image. When a shutter release signal is input in the first mode, the processor 120 may determine a plurality of zoom levels and control the image capturer 110 to continuously capture images at the plurality of determined zoom levels. The image capturer 110 may continuously capture a plurality of images at a plurality of set zoom levels while adjusting the position of the lens and the opening of the aperture, based on the control signal from the processor 120.

The processor 120 may control an overall operation of the image processing apparatus 100. For example, the processor 120 may control overall operations of the image capturer 110, the storage 130, the display 140, and the user input part (not illustrated).

The processor 120 may control the image capturer 110 to capture a plurality of images at a plurality of zoom levels. FOVs of the plurality of images may be determined to include a region of interest (ROI). The ROI may be determined based on a user input, or may be automatically determined. According to an embodiment of the present disclosure, the processor 120 may set an ROI according to a control signal that is input through the user input part. According to another embodiment of the present disclosure, the processor 120 may recognize objects from an input image generated by the image capturer 110, and set an ROI corresponding to each of the recognized objects.

The object may include a person, a thing, an animal, or a building. The ROI may be defined and recognized as a specific area in an image and may include one or more objects. According to an embodiment of the present disclosure, a user may select at least one ROI. According to another embodiment of the present disclosure, the processor 120 may set at least one ROI based on a focus value of an input image captured by the image capturer 110. In addition, the processor 120 may control the image capturer 110 to capture at least one image with respect to the at least one ROI by zooming in on the at least one ROI.

When the ROI is determined, the processor 120 may determine at least one FOV to include the ROI, and may control the image capturer 110 to capture at least one image with respect to the ROI by zooming in with the determined at least one FOV. The processor 120 may determine a zoom level according to the determined FOV. As described above, the processor 120 may control the image capturer 110 to continuously capture the plurality of images by zooming in at the determined FOVs in response to the shutter release signal that is input once. The shutter release signal may be input through the user input part.

Additionally, the processor 120 may generate and output one selected from among guide information for adjusting FOVs, information about a progress of a capturing process, information about set FOVs, information about a capturing mode, and combinations thereof. These pieces of information may be output through the display 140 in various forms, such as a graphics user interface (GUI) output, an audio output, a light-emitting diode (LED) blinking output, a vibration output, or combinations thereof. For example, the processor 120 may output guide information that adjusts the FOV so as to include the ROI. According to another embodiment of the present disclosure, when the zoom level of the selected ROI or object is changed, the processor 120 may output and display the changed result on the display 140.

The processor 120 may generate files for storing a plurality of captured images by performing post-processing, encoding, and the like, and store the generated files in the storage 130. Encoding methods and file formats for a plurality of image files may be variously determined according to various embodiments.

The processor 120 may reproduce a plurality of images captured at a plurality of zoom levels and display the plurality of images on the display 140. The processor 120 may display, on the display 140, a first image among the plurality of images, and may display, on the display 140, a second image having a zoom level different from a zoom level of the first image among the plurality of images according to a control signal input thereto. The second image is an image having a zoom level different from the zoom level of the first image and has different FOVs. The processor 120 may provide a user interface (UI) that allows the user to select the second image having different FOVs. The selection of the second image may be performed by various methods, such as a selection of a zoom level, a selection of an FOV, or an automatic selection.

According to an embodiment of the present disclosure, while the first image is displayed, the processor 120 may display, on the first image, a mark indicating an FOV of an image having a zoom level different from a zoom level of the first image or a mark indicating information about an image having a focus different from a focus of the first image. The first image may be a refocusable image including an ROI.

The first image may be selected by a user input, or may be automatically selected. According to an embodiment of the present disclosure, in a case where the user selects a certain image and the selected image is a refocusable image captured at a plurality of zoom levels, the processor 120 may provide information indicating that the corresponding image is a refocusable image, or may provide information about a selectable FOV, while the selected image is displayed on the display 140. According to another embodiment of the present disclosure, in a case where a group corresponding to a plurality of refocusable images is set and a user selects the group of the refocusable images, the processor 120 may display a representative image of the selected group on the display 140. The representative image may be changed according to various embodiments. For example, the representative image may be an image having the widest FOV, an image having the deepest depth, or an image generated by synthesizing a plurality of images.

The displaying of the second image may be realized by various methods, such as screen change, overlay, or screen splitting.

The display 140 may display at least one selected from among the plurality of images having different zoom levels. The display 140 may be, for example, a liquid crystal display (LCD), an organic electroluminescence (EL) display, a plasma display panel (PDP), an electronic paper. An image displayed on the display 140 may be an image processed and output by the processor 120. The processor 120 may process an image into a format (e.g., a red, green, blue (RGB) image) displayable on the display 140 and output the processed image to the display 140.

While the first image is displayed, the display 140 may display, on the first image, a mark indicating an FOV of an image having a zoom level different from a zoom level of the first image. The display 140 may display a GUI screen to allow a selection of a zoom level different from a zoom level of the first image or a selection of a second image having a zoom level different from a zoom level of the first image according to a control signal that is input from the processor 120. In addition, the display 140 may display the second image having the selected zoom level or the second image selected by the user.

The user input part (not illustrated) may receive a user input. According to an embodiment of the present disclosure, the user input part (not illustrated) may receive a control signal that instructs capturing (e.g., a shutter release signal) and a signal that selects at least one ROI.

The user input part (not illustrated) may include a key pad, a dome switch, a touch pad (a capacitive-type touch pad, a resistive-type touch pad, an infrared beam-type touch pad, a surface acoustic wave-type touch pad, an integral strain gauge-type touch pad, a piezo effect-type touch pad, and the like), a jog wheel, and a jog switch, but is not limited thereto.

According to an embodiment of the present disclosure, the display 140 and the user input part (not illustrated) may be integrally configured like a touch screen. In this case, the selection of the ROI may be a touch input of selecting a certain area including at least one object. For example, in a live view mode, the user may select an ROI through a gesture input. A gesture of the user may include a tap, a touch-and-hold, a double-tap, a drag, a panning, a flick, a drag, a swipe, a hovering, and the like.

According to another embodiment of the present disclosure, the user input part (not illustrated) may be a mouse. According to an embodiment of the present disclosure, the selection of the ROI may be a mouse input of clicking a certain area including at least one object. For example, the user may select one of a plurality of ROIs by putting a mouse pointer on an ROI to be selected and then clicking the ROI. According to another embodiment of the present disclosure, the selection of the ROI may be a mouse drag input of directly designating a certain area including at least one object. For example, the user may designate an ROI by dragging an area of an object to be selected while clicking a mouse.

The storage 130 may store image files generated by the processor 120. The storage 130 may be, for example, a flash memory, a solid state driver (SSD), a secure digital (SD) card, a micro SD card, a smart media card (SMC), a compact flash (CF) card, a memory stick, or an extreme digital (XD) picture card.

According to an embodiment of the present disclosure, the image processing apparatus 100 may further include a communicator (not illustrated). The image processing apparatus 100 may transmit a refocusable image file to other devices via the communicator.

According to an embodiment of the present disclosure, the image processing apparatus 100 may include the image capturer 110, the processor 120, and the storage 130. According to an embodiment of the present disclosure, the image capturer 110 may capture a plurality of images having different zoom levels, and the processor 120 may generate an image file including refocus information and image data with respect to each of the plurality of images. The storage 130 may store the image file generated by the processor 120 with respect to each of the plurality of images. The refocus information is used to perform refocus processing during the reproducing of the image file. The refocus information may include information indicating that the corresponding image file is a refocusable image and a path of a file to be referred to for the refocus processing. The path of the file to be referred to for the refocus processing may be, for example, a path of an image file belonging to a group of refocusable images, or a path of a separate refocus information file that stores information used to perform the refocus processing. According to another embodiment of the present disclosure, the image processing apparatus 100 may include the processor 120, the storage 130, and the display 140. According to an embodiment of the present disclosure, the storage 130 may store a plurality of images having different zoom levels and refocus information, and the display 140 may display a first image among the plurality of images. When a control input is received, the processor 120 may control the display 140 to display a second image having a zoom level different from a zoom level of the first image among the plurality of images, based on the refocus information. When a control input of requesting refocus is received, the processor 120 may search for the second image corresponding to a focus requested by a user based on the refocus information stored in the image file that stores the first image, may search the storage 130 for the image file of the second image, may reproduce the image file of the second image, and may display the second image on the display 140.

Figure 2:
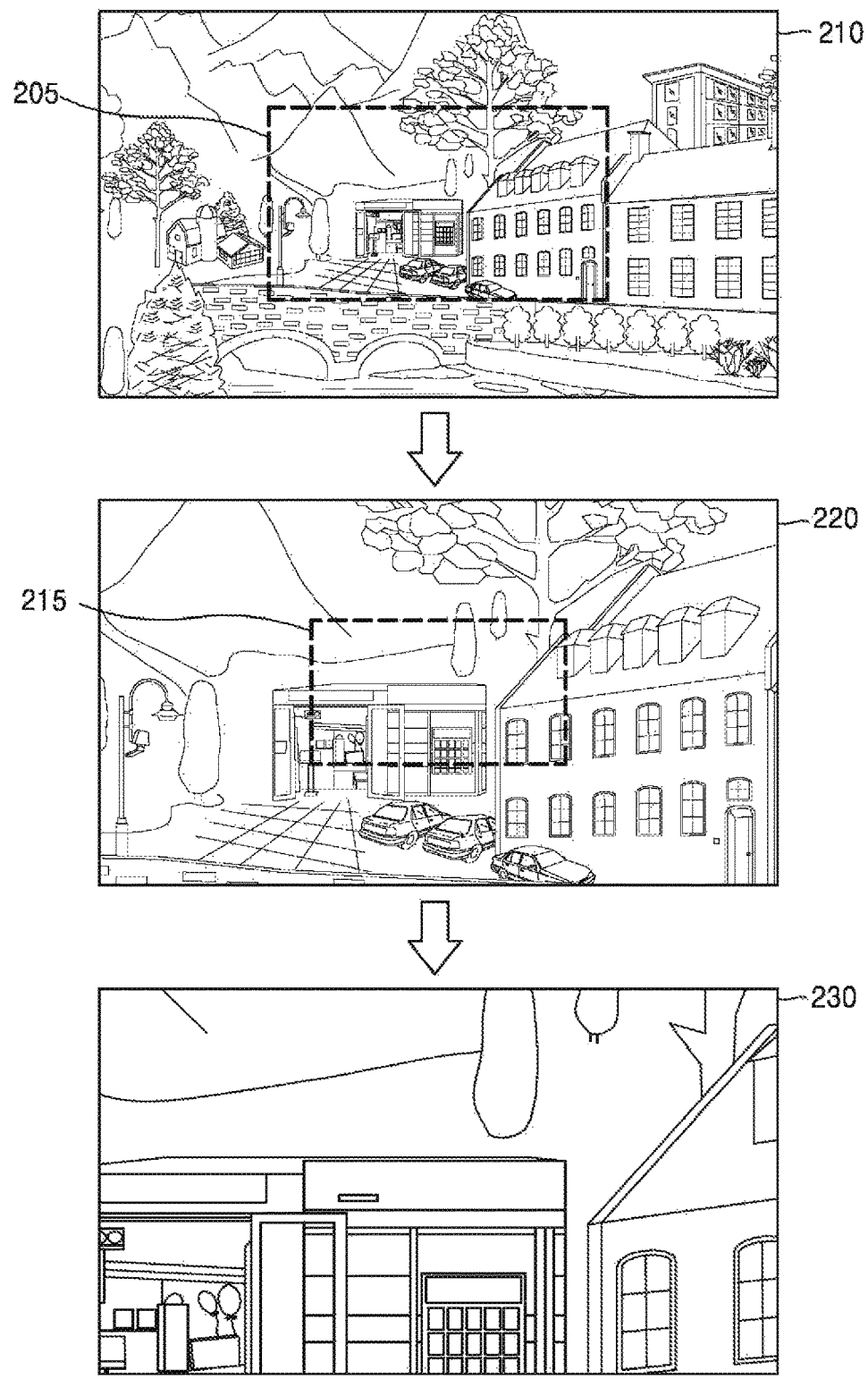
FIG. 2 is a diagram for describing a process of capturing a plurality of images having different zoom levels according to an embodiment of the present disclosure.

FIG. 2 is a diagram for describing a process of capturing a plurality of images having different zoom levels according to an embodiment of the present disclosure.

Referring FIG. 2, a user captures a first image 210 including a plurality of objects. According to various embodiments of the present disclosure, the first image 210 may be at least one selected from among a live view image, a quick view image, an image reproduced from an image file. When an ROI 205 in the first image 210 is determined automatically or by a user, the image processing apparatus 100 zooms in on the ROI 205. A second image 220 is an image captured by zooming in on the ROI 205. When an ROI 215 in the second image 220 is determined, the image processing apparatus 100 zooms in on the ROI 215. A third image 230 is an image captured by zooming in on the ROI 215. A process of capturing a plurality of images having different zoom levels while gradually zooming in has been described in the above example, but embodiments are not limited thereto. The zoom level may be changed by zooming out.

FIG. 3 is a diagram for describing a process of displaying one image among captured images according to an embodiment of the present disclosure.

Referring to FIG. 3, in operation S302, the display 140 of the image processing apparatus 100 may display one image among the plurality of images captured at different zoom levels, as described above with reference to FIG. 2. According to an embodiment of the present disclosure, while the image is displayed, a mark indicating an ROI 310 may be displayed in various forms. For example, when a user touches one position of the displayed image, a box may be displayed which sets a certain area including the touched position as the ROI 310.

In operation S304, the image processing apparatus 100 may display an image having a zoom level different from a zoom level of the image displayed in operation S302, based on a control input. According to an embodiment of the present disclosure, the image having the different zoom level may be an image captured by zooming in on the ROI 310. The control input may be a user touch input of selecting the ROI 310 and performing control to zoom in on the selected ROI 310.

Figure 4:
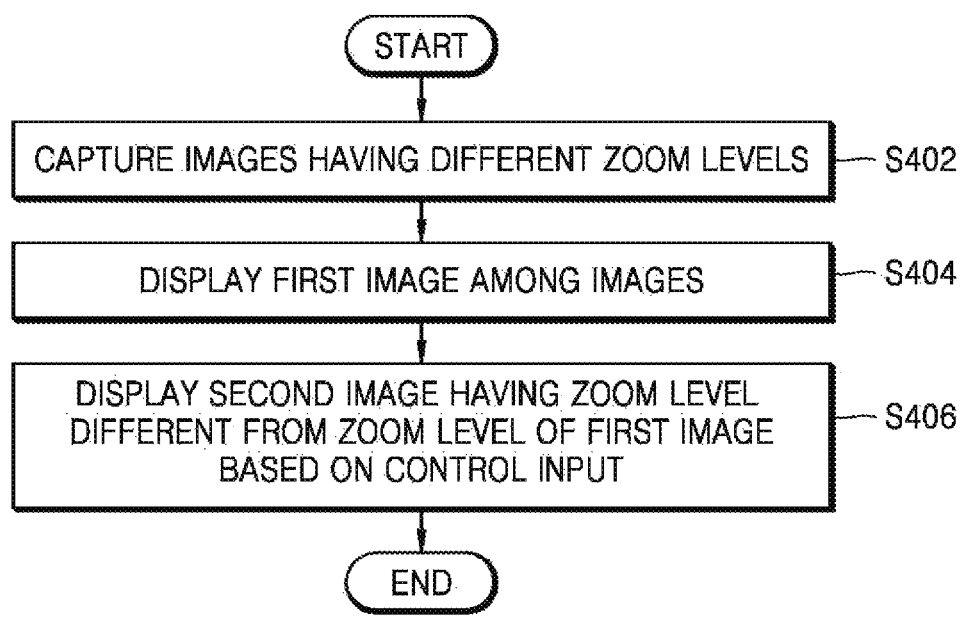
FIG. 4 is a flowchart of an image processing method according to an embodiment of the present disclosure.

FIG. 4 is a flowchart of an image processing method according to an embodiment of the present disclosure.

Referring to FIG. 4, each operation of the image processing method may be performed by an electronic device including an image processor and a storage medium. The following descriptions will focus on embodiments in which the image processing apparatus 100 set forth herein performs the image processing method. Therefore, the embodiments provided with respect to the image processing apparatus 100 may be applied to the image processing method, and the embodiments provided with respect to the image processing method may be applied to the image processing apparatus 100. The image processing methods according to various embodiments are not limited to those performed by the image processing apparatus 100 set forth herein, and may be performed by various electronic devices.

In operation S402, the image processing apparatus 100 may capture a plurality of images having different zoom levels. Operation S402 is substantially the same as described with reference to FIG. 2. According to an embodiment of the present disclosure, in operation S402, the image processing apparatus 100 may further perform focusing processing in addition to changing of the zoom level.

In operation S404, the image processing apparatus 100 may display a first image among the plurality of images. According to an embodiment of the present disclosure, the first image may be an image having the widest FOV in a group of images that corresponds to the refocusable image. Since operation S404 corresponds to operation S302, descriptions thereof will be omitted.

In operation S406, the image processing apparatus 100 may display a second image having a zoom level different from a zoom level of the first image among the plurality of images, based on a control input. The second image may be an image obtained by zooming in on an ROI of the first image.

Figure 5:
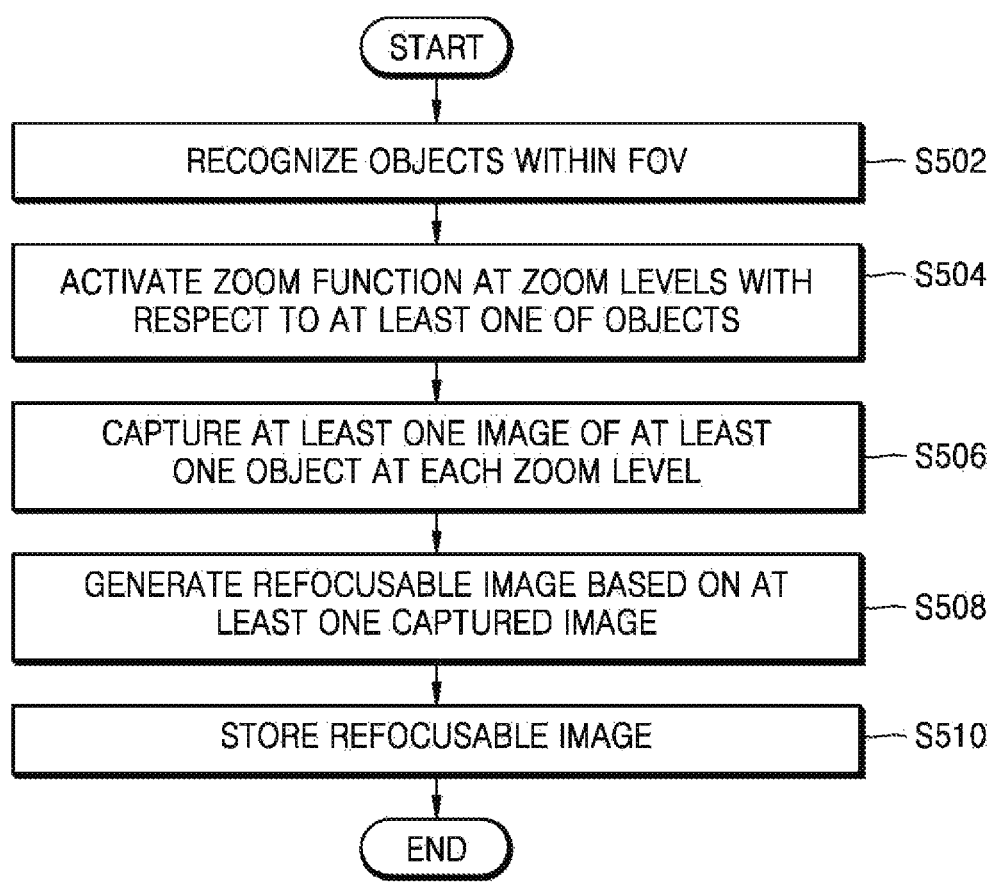
FIG. 5 is a flowchart of a method of capturing a plurality of images in an image processing apparatus according to an embodiment of the present disclosure.

FIG. 5 is a flowchart of a method of capturing a plurality of images in an image processing apparatus according to an embodiment of the present disclosure.

Referring to FIG. 5, in operation S502, the image processing apparatus 100 may recognize a plurality of objects within an FOV. According to an embodiment of the present disclosure, the image processing apparatus 100 may recognize the plurality of objects within the FOV by using a sensor provided therein. According to another embodiment of the present disclosure, the image processing apparatus 100 may recognize the plurality of objects within the FOV by using an object recognition algorithm.

In operation S504, the image processing apparatus 100 may activate a zoom function at a plurality of zoom levels with respect to one or more objects among the recognized objects. According to an embodiment of the present disclosure, the image processing apparatus 100 may cause an imaging element to activate a zoom function with respect to objects at a plurality of zoom levels.

In operation S506, the image processing apparatus 100 may capture one or more images with respect to one or more objects at the plurality of zoom levels. Unlike the existing methods, the image processing apparatus 100 may cause the imaging element to capture images of objects at the plurality of zoom levels.

In operation S508, the image processing apparatus 100 may generate a refocusable image based on the images captured at the plurality of zoom levels. The image processing apparatus 100 may generate a refocusable image based on the captured images.

In operation S510, the image processing apparatus 100 may store the refocusable image in the storage 130.

According to an embodiment of the present disclosure, the refocusable image with respect to the objects may be generated at the same zoom level. In order to generate the refocusable image, a plurality of images are captured at the same zoom level. According to an embodiment of the present disclosure, the image processing apparatus 100 may zoom in at an FOV including a plurality of objects and sequentially focus on the plurality of objects (or ROIs) so that the plurality of objects concluded as the same focal plane are recognized on different focal planes. The entire captured images may be synthesized so as to generate a refocusable image having a refocus effect. By providing the refocus effect, the user may select each object present within the same depth and view objects that are in focus.

According to the embodiments of the present disclosure, the refocus is possible with respect to objects recognized as being present on the same focal plane or at the same depth. In this case, the imaging element may automatically zoom in at a plurality of zoom levels so that objects are present at different focal depths and a plurality of images for refocus are captured.

FIG. 6 is a diagram for describing a user's selection of an ROI according to an embodiment of the present disclosure.

Referring FIG. 6, in operation S602, a user may select an ROI in a live view mode prior to capturing. In the live view mode, the processor 120 may display, on the display 140, a preview box 622 indicating an ROI automatically determined by a certain criteria. According to an embodiment of the present disclosure, a center 610 of the automatically set preview box 622 may be displayed on the display 140. The processor 120 may determine the preview box 622 by using various methods. For example, the processor 120 may set the preview box 622 to include at least one selected from among objects recognized based on object recognition. According to another embodiment of the present disclosure, the processor 120 may set the preview box 622 around an area having a high focus value. According to another embodiment of the present disclosure, the processor 120 may set the preview box 622 to include a face area based on face detection. While the automatically determined preview box 622 is displayed, the processor 120 may receive a user input of selecting a position of the preview box 622 through a user input part. For example, the user may select a center 620 of a bounding box indicating an ROI that is desired to zoom in by the user.

In operation S604, the image capturer 110 may zoom in on the ROI with respect to the center 620 of the bounding box. The processor 120 may control the image capturer 110 to capture at least one image with respect to at least one ROI determined by the user's selection.

Figure 7:
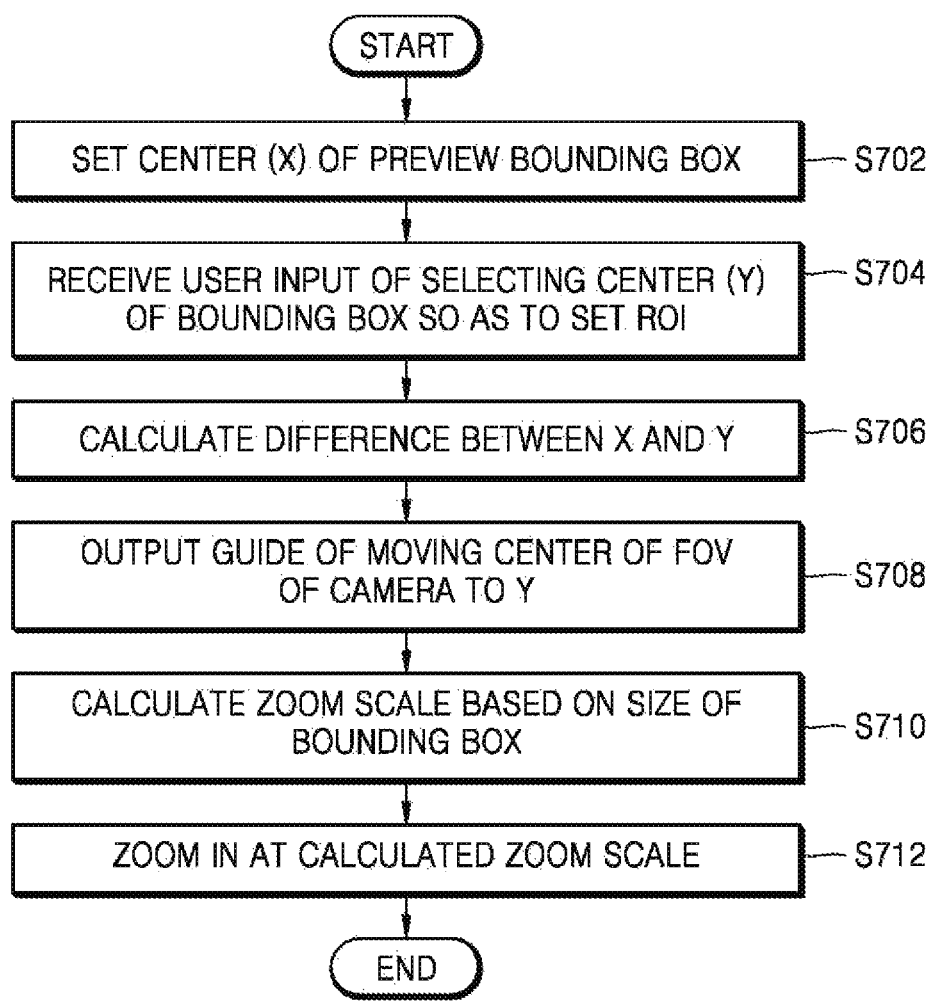
FIG. 7 is a flowchart of a method of selecting an ROI so as to capture a plurality of images at a plurality of zoom levels according to an embodiment of the present disclosure.

FIG. 7 is a flowchart of a method of selecting an ROI so as to capture a plurality of images at a plurality of zoom levels according to an embodiment of the present disclosure. The sequence of operations of FIG. 7 may be performed by a microcontroller, a microprocessor, and the like. Operations of FIG. 7 will be described with reference to FIG. 6.

Referring to FIG. 7, in operations S702 and S704, the image processing apparatus 100 may recognize and determine a plurality of objects within an FOV during image capturing. When the plurality of objects are recognized, a user may manually select a bounding box as illustrated in FIG. 6.

In operation S706, a difference between a center 610 of a bounding box indicating an automatically set preview box and a center 620 of the bounding box selected by the user may be calculated.

In operation S708, the image processing apparatus 100 may guide the user to adjust a center of a camera FOV toward the center 620 of the bounding box selected by the user.

In operation S710, a zoom scale may be calculated based on a size of the bounding box. For example, the processor 120 may calculate a zoom level for adjusting the FOV to the bounding box based on a ratio of a size of a current FOV to a size of the bounding box.

In operation S712, a zoom function may be activated based on the calculated zoom level, and zoom-in is performed at the calculated zoom level.

As illustrated in FIG. 6, zoom-in is performed at the calculated zoom scale and an image is captured.

Various operations in the flowchart of FIG. 7 may be performed in the order illustrated in FIG. 7, or may be performed differently from the order illustrated in FIG. 7, or may be performed substantially at the same time. Furthermore, in some embodiments of the present disclosure, some processes, blocks, operations, and the like, may be variously changed without departing from the scope of the present disclosure. For example, some processes, blocks, operations, and the like, may be omitted, added, modified, or skipped.

Figure 8:
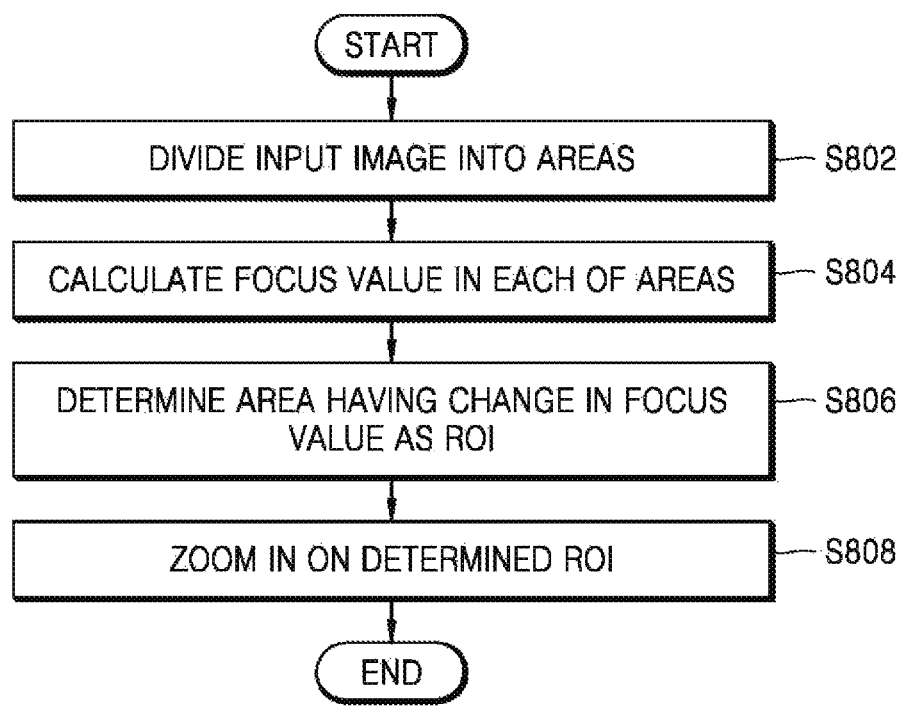
FIG. 8 is a flowchart of a method of automatically determining an ROI according to an embodiment of the present disclosure.

FIG. 8 is a flowchart of a method of automatically determining an ROI according to an embodiment of the present disclosure.

Figure 9:
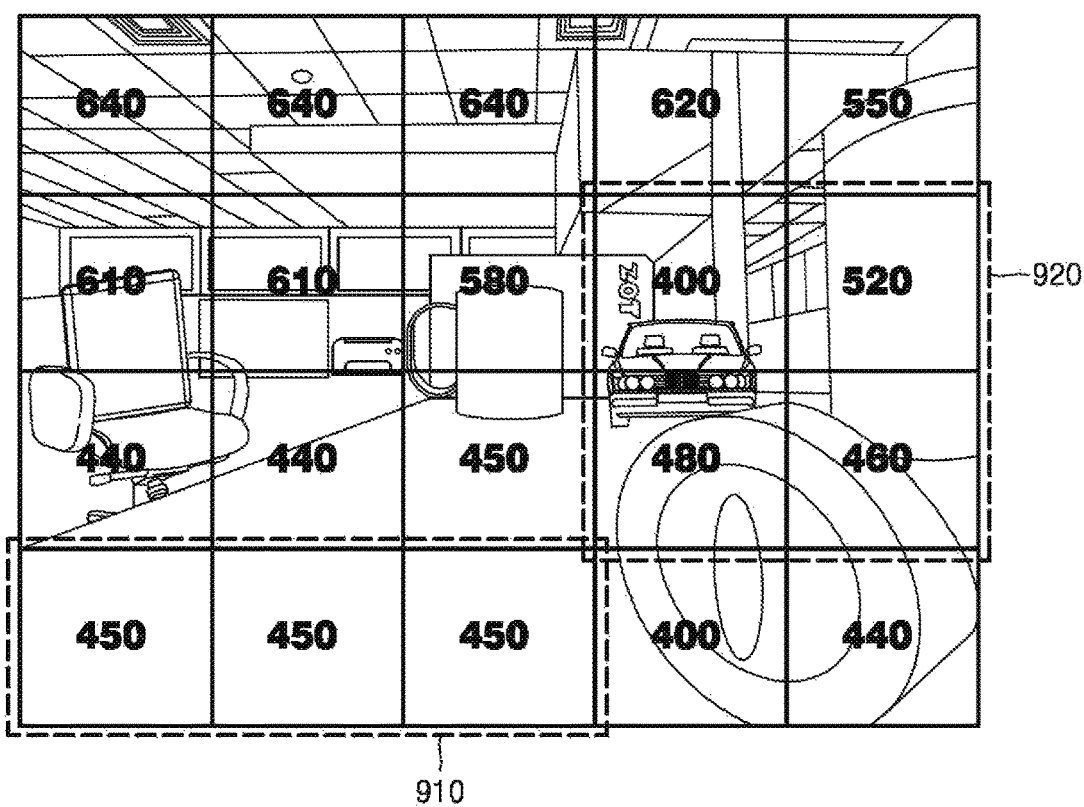
FIG. 9 is a diagram for describing a method of determining a high activity area as an ROI based on a focus value according to an embodiment of the present disclosure.

Referring to FIG. 8, in operation S802, the image processing apparatus 100 may divide an input image into a plurality of areas. According to an embodiment of the present disclosure, the image processing apparatus 100 may divide an input image captured by the image capturer 110 into a plurality of areas, as illustrated in FIG. 9. A size and a shape of each of the plurality of areas may be variously determined according to various embodiments. In addition, the plurality of areas may have different sizes and different shapes.

In operation S804, the image processing apparatus 100 may detect a focus value with respect to each of the plurality of areas. The focus value may be calculated by, for example, an optical auto focusing (AF) method or a contrast AF method. According to the optical AF method, the focus value may be detected based on a signal that is detected by an AF optical system. According to the contrast AF method, the focus value may be detected based on a contrast value of each area of the input image.

In operation S806, the image processing apparatus 100 may determine an area having a change in the focus value as the ROI. An area having a great change in the focus value is a high activity area in which the user is highly likely to be interested. Therefore, the processor 120 may determine the high activity area as the ROI. The high activity area will be described and with reference to FIG. 9.

In operation S808, the image processing apparatus 100 may zoom in on the determined ROI. The processor 120 may control the image capturer 110 to capture at least one image with respect to the determined at least one ROI.

FIG. 9 is a diagram for describing a method of determining a high activity area as an ROI based on a focus value according to an embodiment of the present disclosure. Descriptions already provided with reference to FIG. 8 will be omitted.

Referring to FIG. 9, the processor 120 may detect a focus value with respect to each of the plurality of areas defined by dividing the input image. In addition, the processor 120 may determine an area having a great change in the detected focus value as a high activity area 920, and may determine an area having a slight change in the detected focus value as a low activity area 910. The great change in the focus value means that a difference of focus values between adjacent areas is great. As illustrated in FIG. 9, the high activity area 920 includes four areas that respectively have focus values of 400, 520, 480, and 460. The low activity area 910 includes three areas that respectively have focus values of 450. The high activity area 920 has a great change in the focus value and is an area in which the user is highly likely to be interested because there is high probability that at least one object will be included therein. Therefore, the image processing apparatus 100 may automatically determine the high activity area 920 as the ROI, without any separate user input.

Figure 10:
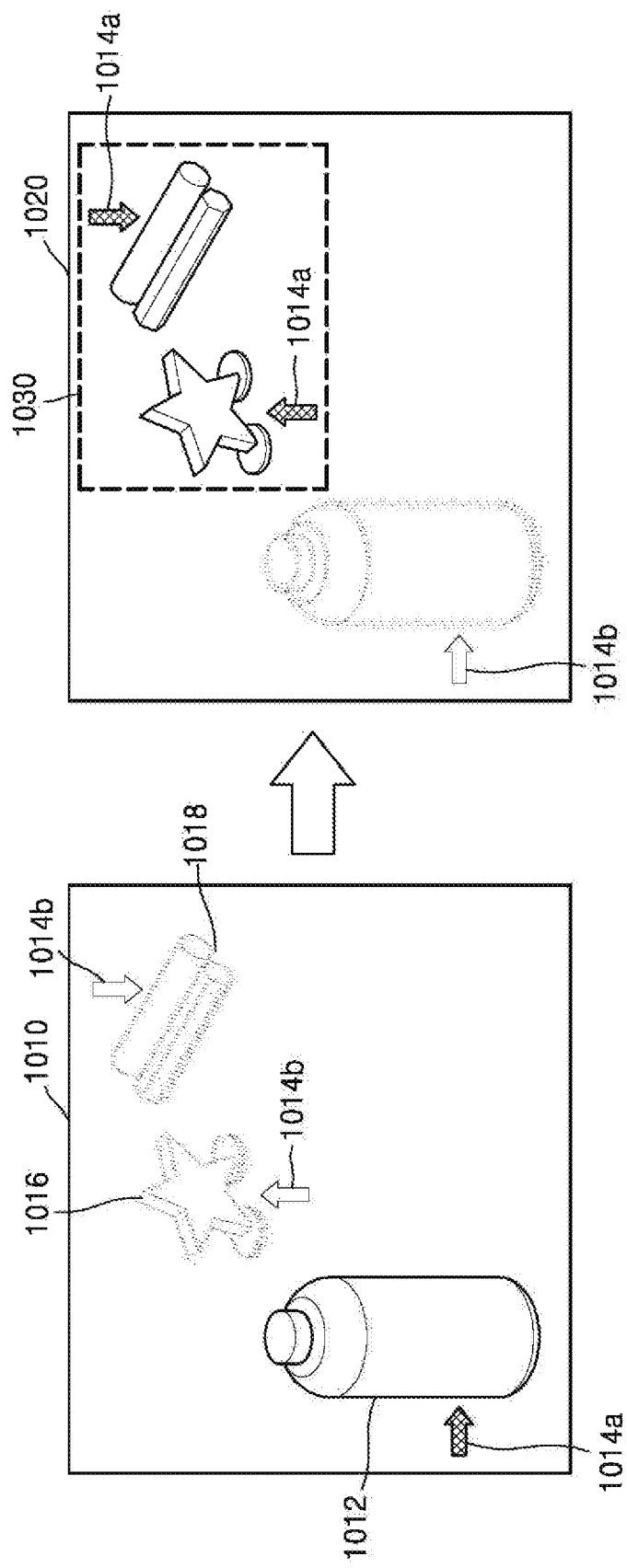
FIG. 10 is a diagram for describing a process of capturing images having different focuses at a same zoom level according to an embodiment of the present disclosure.

FIG. 10 is a diagram for describing a process of capturing images having different focuses at a same zoom level according to an embodiment of the present disclosure.

Referring to FIG. 10, a first image 1010 and a second image 1020 are images that are captured at the same zoom level and have different focuses. The first image 1010 is an image captured by focusing on a first object 1012 having a near depth, and the second image 1020 is an image captured by focusing on a second object 1016 and a third object 1018 having a far depth. The depth means a sense of depth of a certain object in an image. An arrow 1014a indicates in-focus and an arrow 1014b indicates out-focus. The second object 1016 and the third object 1018 having a far depth are concluded as the same focal plane. Thus, both the second object 1016 and the third object 1018 are out-focus like in the first image 1010, or both the second object 1016 and the third object 1018 are in-focus like in the second image 1020. An area 1030 including a plurality of objects recognized as being placed on the same focal plane will be described and with reference to FIG. 11.

Figure 11:
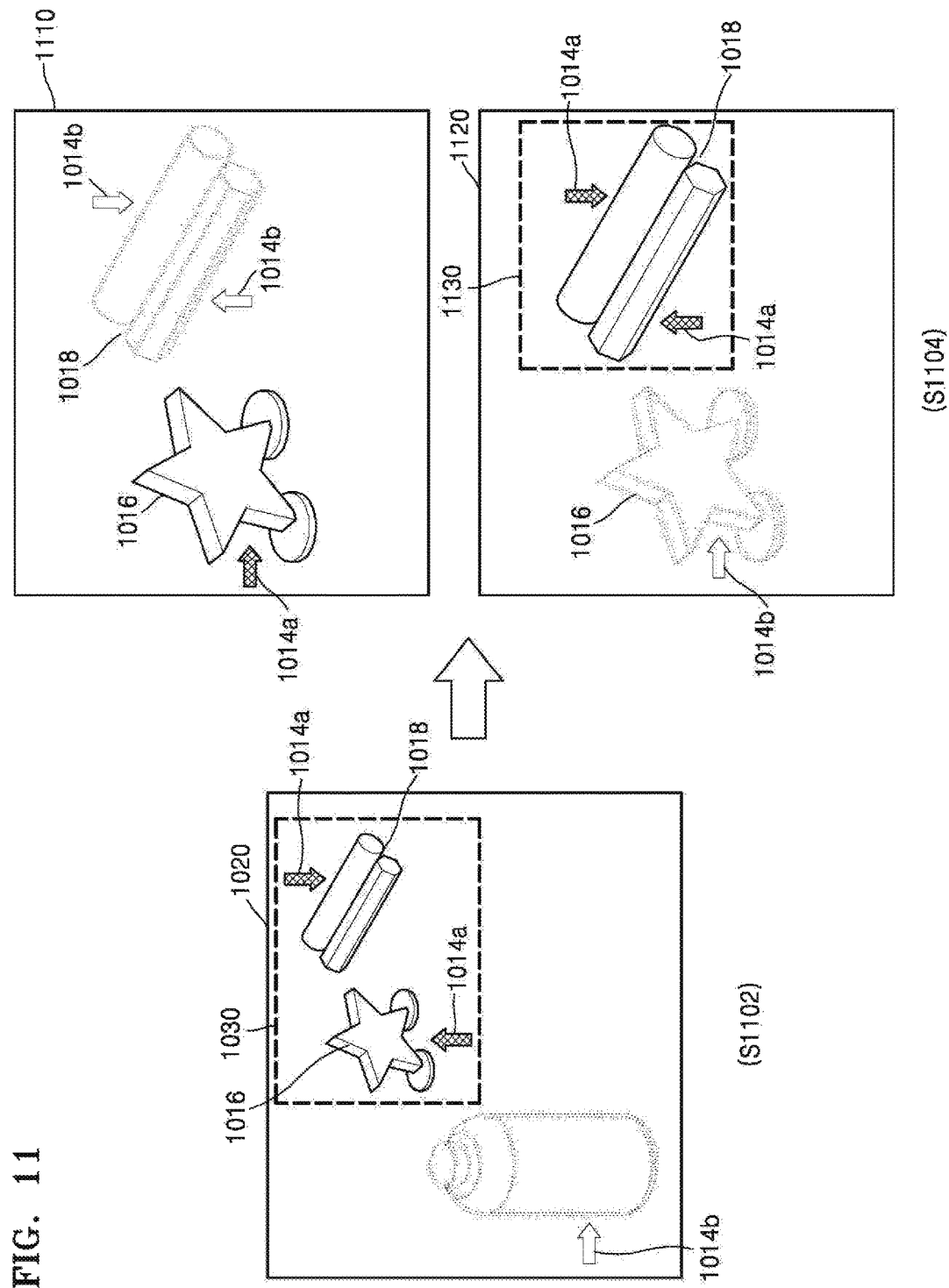
FIG. 11 is a diagram for describing a process of zooming in on an area including a plurality of objects recognized as being placed on a same focal plane according to an embodiment of the present disclosure.

FIG. 11 is a diagram for describing a process of zooming in on an area including a plurality of objects recognized as being placed on a same focal plane according to an embodiment of the present disclosure.

Referring to FIG. 11, in operation S1102, the area 1030 including a plurality of objects recognized as being placed on the same focal plane may be detected. That the second object 1016 and the third object 1018 are recognized as being placed on the same focal plane means that the second object 1016 and the third object 1018 are concluded as the same focal plane. The plurality of objects concluded as the same focal plane are all in-focus or out-focus. Therefore, in the second image 1020, the second object 1016 and the third object 1018 recognized as being placed on the same focal plane are all in-focus.

In operation S1104, the image processing apparatus 100 may zoom in on the area 1030 including the plurality of objects 1016 and 1018 recognized as being placed on the same focal plane. Since the image processing apparatus 100 zooms in on the area 1030 including the second object 1016 and the third object 1018 concluded as the same focal plane, the second object 1016 and the third object 1018 may be distinguished as different focal planes. Thus, it is possible to focus on each of the plurality of objects. A third image 1110 is an image captured by focusing on the second object 1060 placed at a short distance, and a fourth image 1120 is an image captured by focusing on the third object 1018 placed at a long distance.

The third object 1018 including a plurality of objects is present in the zoomed-in fourth image 1120, and descriptions thereof will be described with reference to FIG. 12.

Figure 12:
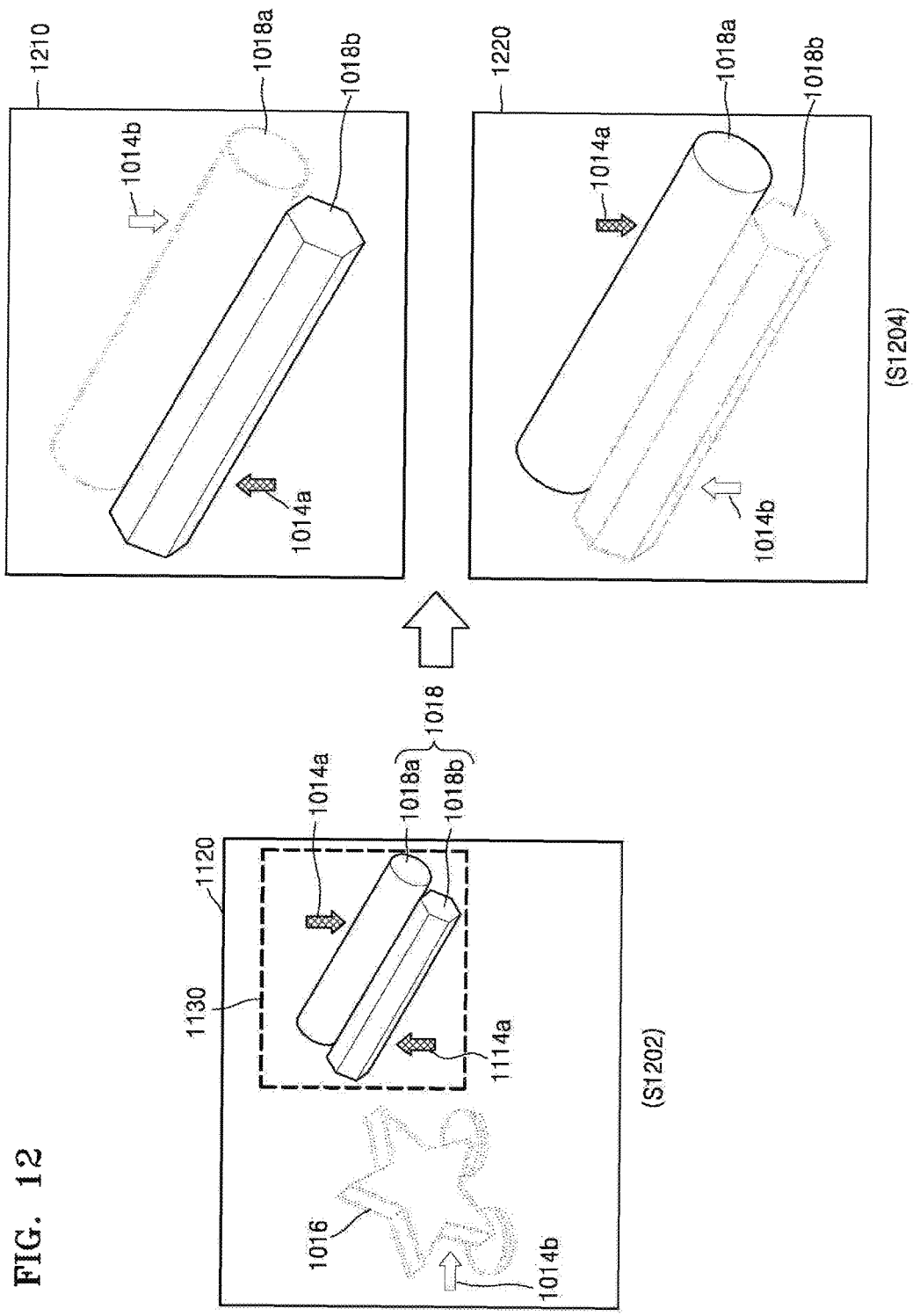
FIG. 12 is a diagram for describing a process of zooming in on an area including a plurality of objects recognized as being placed on a same focal plane according to an embodiment of the present disclosure.

FIG. 12 is a diagram for describing a process of zooming in on an area including a plurality of objects recognized as being placed on a same focal plane according to an embodiment of the present disclosure.

Referring to FIG. 12, in operation S1202, the area 1130 including a fifth object 1018a and a sixth object 1018b recognized as being placed on the same focal plane may be detected in the fourth image 1120. The fifth object 1018a and the sixth object 1018b recognized as being placed on the same focal plane are concluded as the same focal plane. The plurality of objects 1018a and 1018b concluded as the same focal plane are all in-focus or out-focus.

In operation S1204, the image processing apparatus 100 may zoom in on the area 1130 including the fifth object 1018a and the sixth object 1018b recognized as being placed on the same focal plane. By zooming in on the area 1130 including the fifth object 1018a and the sixth object 1018b recognized as being placed on the same focal plane, the fifth object 1018a and the sixth object 1018b may be detected as being placed on different focal planes. Thus, it is possible to focus on each of the plurality of objects. The fifth image 1210 is an image captured by focusing on the fifth object 1018a having a near depth, and the sixth image 1220 is an image captured by focusing on the sixth object 1018b having a far depth.

Figure 13:
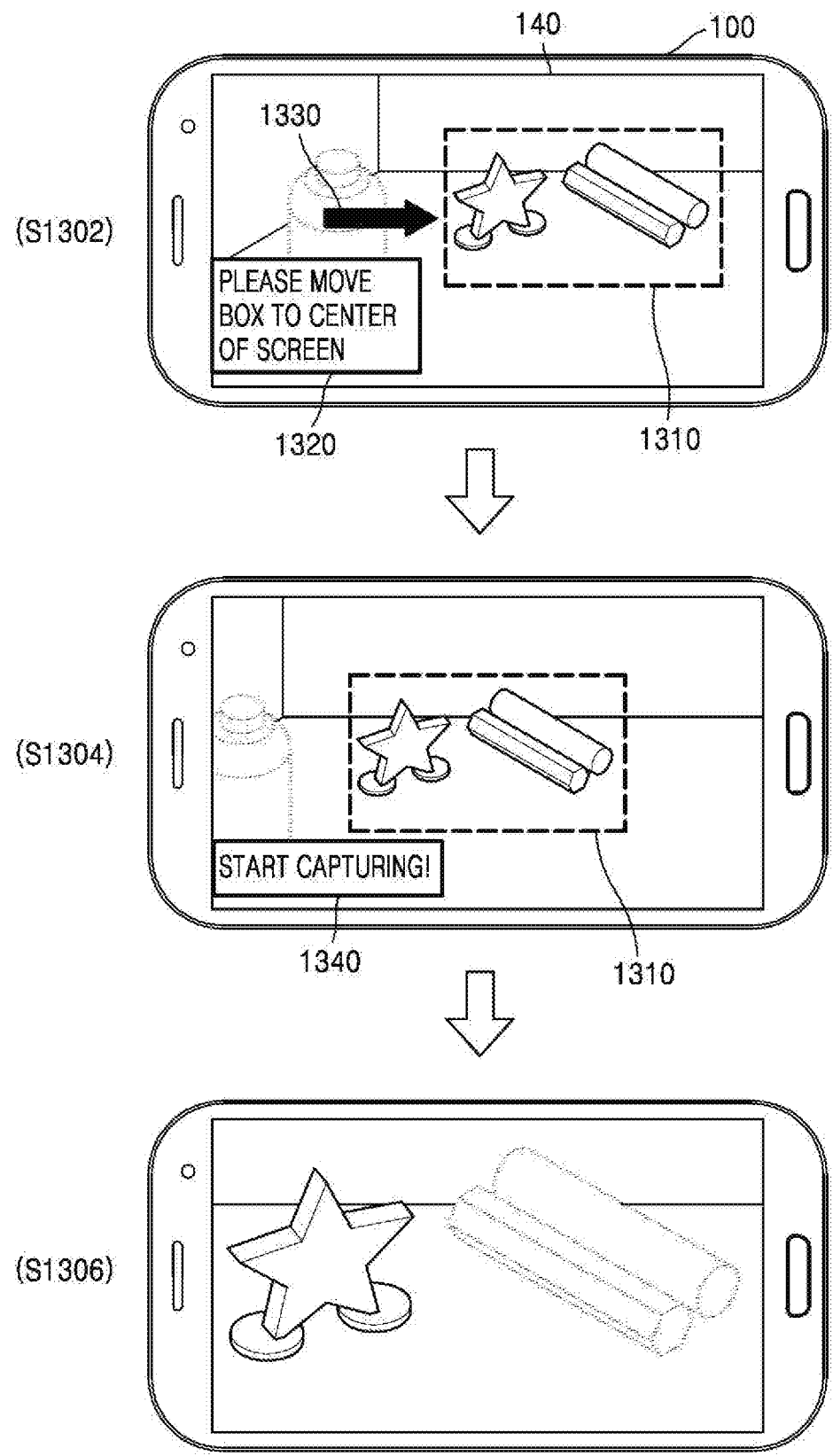
FIG. 13 is a diagram for describing an operation of providing a user guide so as to adjust a field of view (FOV) with respect to an ROI according to an embodiment of the present disclosure.

FIG. 13 is a diagram for describing an operation of providing a user guide so as to adjust an FOV with respect to an ROI according to an embodiment of the present disclosure.

Referring to FIG. 13, in operation S1302, the image processing apparatus 100 may output guide information for guiding a user to move the image processing apparatus 100 so that an ROI 1310 is placed at a center of an FOV. The guide information may include guides 1320 and 1330 about an operation to be performed by the user so as to move the FOV to the ROI 1310, and information indicating the currently set ROI 1310. For example, the guide information may include an arrow 1330 indicating a direction in which the image processing apparatus 100 needs to be moved by the user, and a text message 1320 explaining the operation of the user. According to another embodiment of the present disclosure, the guide information may be output by using various methods, such as audio, video, vibration, or LED blinking. The image processing apparatus 100 may determine whether the ROI 1310 is placed at the center of the FOV while the FOV is changing. To this end, the image processing apparatus 100 may determine whether a difference between the position of the set ROI 1310 and the position of the FOV is equal to or less than a reference value.

In operation S1304, when the FOV is arranged so that the ROI is placed at the center of the FOV, the image processing apparatus 100 may zoom in on the ROI and perform capturing. According to an embodiment of the present disclosure, the image processing apparatus 100 may output a guide message 1340 indicating that the zoom-in operation and the capturing operation are being performed.

In operation S1306, when the zooming in on the ROI is completed, the image processing apparatus 100 may capture an image having the FOV corresponding to the FOV. According to an embodiment of the present disclosure, after zooming in on the ROI, the image processing apparatus 100 may further perform an operation of focusing on at least one object included in the ROI. According to an embodiment of the present disclosure, when two or more objects are present in the ROI, the image processing apparatus 100 may capture two or more images having different focuses while sequentially focusing on the two or more objects.

Figure 14:
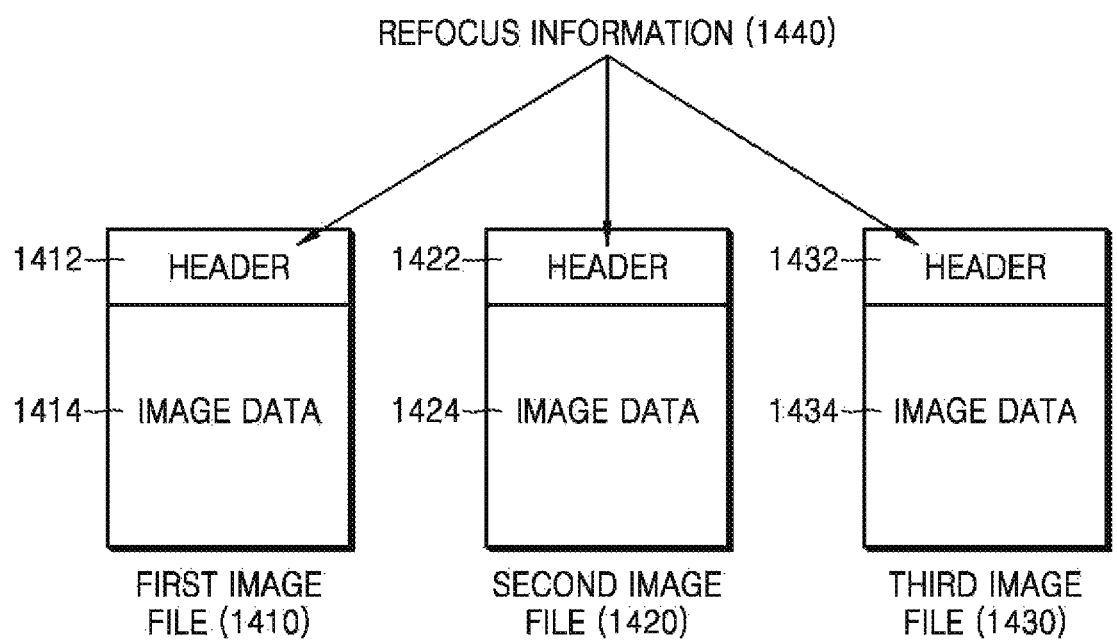
FIG. 14 is a diagram for describing a method of storing a refocusable image according to an embodiment of the present disclosure.

FIG. 14 is a diagram for describing a method of storing a refocusable image according to an embodiment of the present disclosure.

Referring FIG. 14, refocus information 1440 may be included in headers of a plurality of image files related to an image, a focus of which is changeable. The refocus information 1440 may include one selected from among information indicating that the corresponding image is a refocusable image, a path of a file to be referred to for refocus processing, a relationship between image files 1410, 1420, and 1430 belonging to the same group, zoom level information, focus information, and FOV information, and combinations thereof. The refocusable image may be realized by a group of image files having different FOVs or different focuses. The image files belonging to the group may be generated as individual files, or may be generated as one file according to a certain format.

In order to display the image corresponding to the focus selected by the user, it is necessary to manage the relationship between the image files having different FOVs or different focuses and information about the image files. To this end, according to the present embodiment of the present disclosure, the refocus information 1440 is stored in the headers of the plurality of image files, and when the image file is reproduced, the image file corresponding to the focus selected by the user is searched for and reproduced. A case where three image files belong to the same group will be described as an example. However, the number of image files belonging to the same group, data structures of the image files, and formats of the image files may be changed according to various embodiments.

The first image file 1410, the second image file 1420, and the third image file 1430 may store information indicating that a corresponding image is a refocusable image, a relationship between the first to third image files 1410, 1420, and 1430, zoom level information, focus information, and FOV information in headers 1412, 1422, and 1432 thereof.

The information indicating that the corresponding image is the refocusable image is information indicating that the corresponding file is a refocusable image.

The path of the file to be referred to for the refocus processing represents a path of another image file belonging to a group of refocusable images. For example, the first image file 1410 may include a path of the second image file 1420 and a path of the third image file 1430 in the refocus information.

The information about the relationship between the images indicates image files belonging to the same group. In addition, the information about the relationship between the images may include FOV information, zoom level information, focus information, and object information with respect to files except for the corresponding image files. According to an embodiment of the present disclosure, there may be a relationship that at least two of the first to third image files 1410, 1420, and 1430 are images including the same object or ROI. According to an embodiment of the present disclosure, there may be a relationship that at least two of the first to third image files 1410, 1420, and 1430 are images including different focuses at the same zoom level.

The zoom level information indicates information about the zoom level of the corresponding image file. The focus information indicates information about whether the corresponding image file focuses on a certain object within an image. The FOV information indicates information about the position of the FOV of the corresponding image file.

Figure 15:
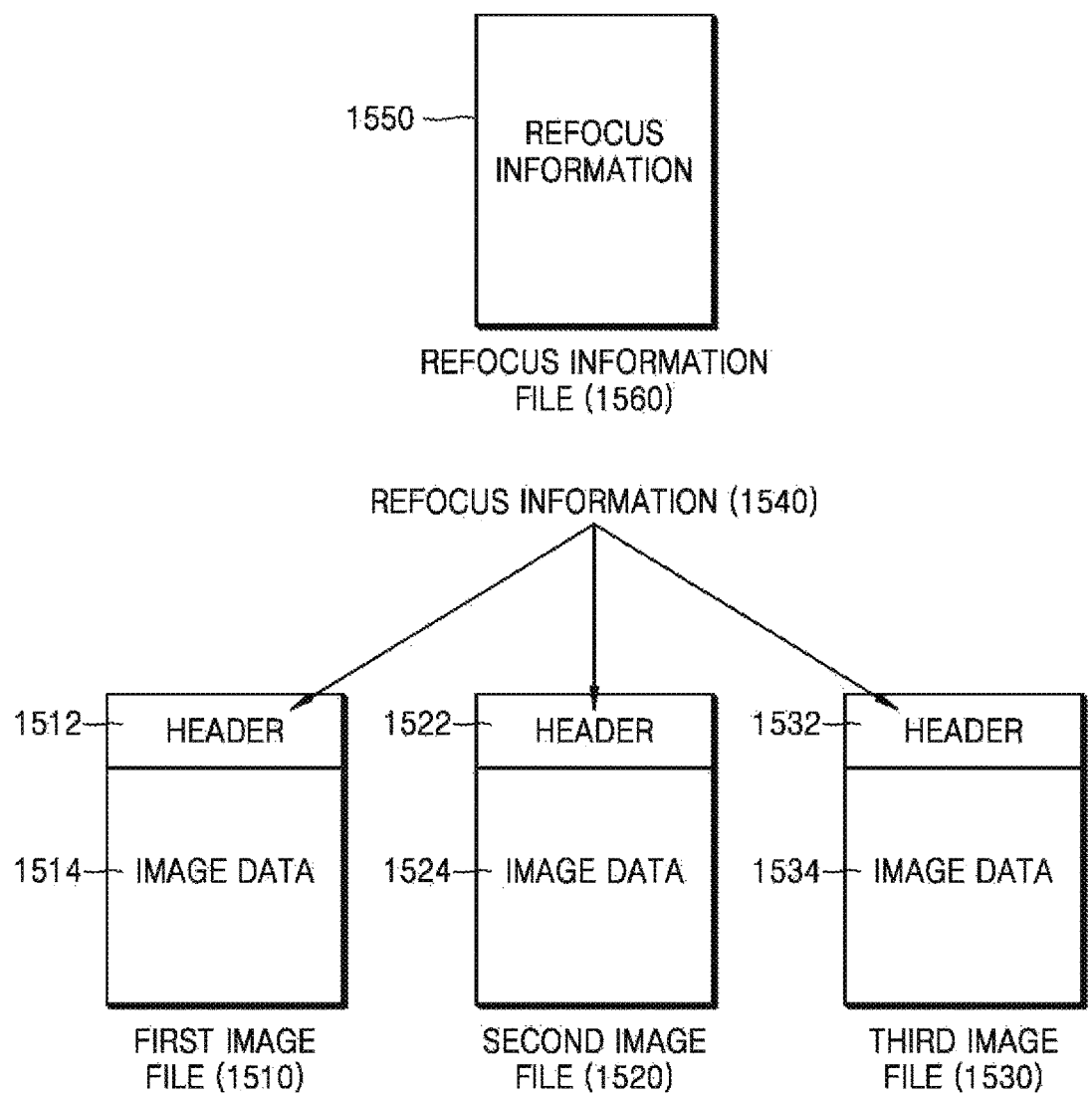
FIG. 15 is a diagram for describing a method of storing a refocusable image according to an embodiment of the present disclosure.

FIG. 15 is a diagram for describing a method of storing a refocusable image according to an embodiment of the present disclosure.

Referring FIG. 15, a separate refocus information file 1560 for storing refocus information 1550 may be generated and stored, and information about the refocus information file 1560 may be stored in image files 1510, 1520, and 1530. The information about the refocus information file 1560 may include, for example, a file name and path information of the refocus information file 1560. Refocus information 1540 may include, for example, information about the image files 1510, 1520, and 1530 related to the refocus, and zoom level information, FOV information, and focus information of the image files 1510, 1520, and 1530. The information about the image files 1510, 1520, and 1530 related to the refocus may include, for example, a file name and path information of each of the image file 1510, 1520, and 1530.

For example, as illustrated in FIG. 15, information indicating that the corresponding files are refocusable images and information about the refocus information file 1560 may be stored in headers 1512, 1522, and 1532 of the image files 1510, 1520, and 1530 including image data 1514, 1524, and 1534, respectively. Therefore, when the headers of the image files are just reviewed, whether the image files are the refocusable images can be known and the path of the refocus information file can be known. In addition, when the refocus information file is reviewed, which image files belong to the group of refocusable images can be known.

The method of generating the separate refocus information file may be useful when a lot of image files corresponding to the refocusable image are present.

Figure 16:
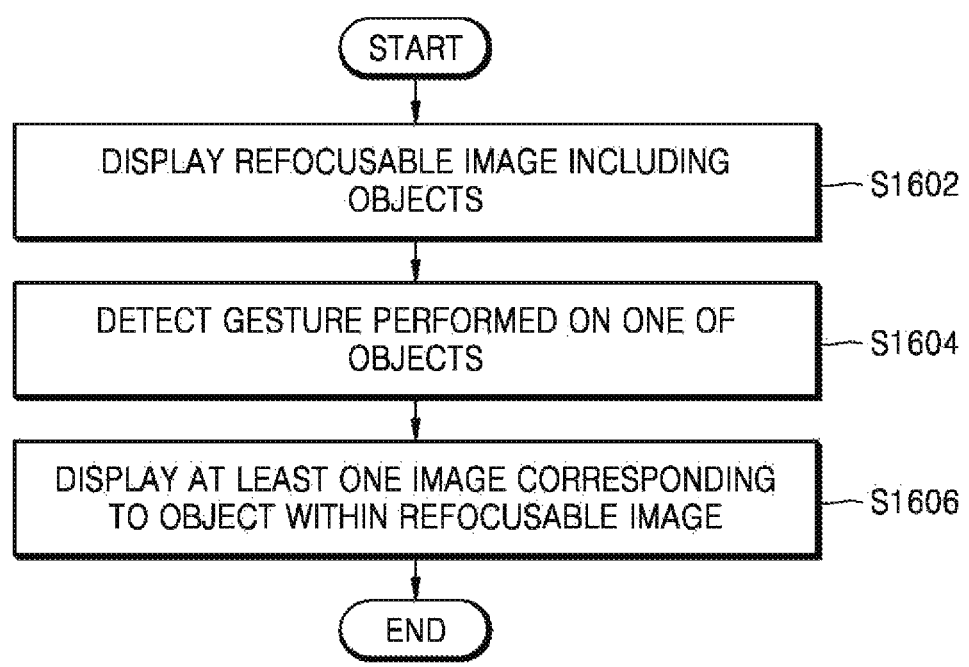
FIG. 16 is a flowchart of a method of refocusing in an image according to an embodiment of the present disclosure.

FIG. 16 is a flowchart of a method of refocusing in an image according to an embodiment of the present disclosure.

Referring to FIG. 16, in operation S1602, the image processing apparatus 100 may display a refocusable image including a plurality of objects. The image processing apparatus 100 may control the display 140 to display the refocusable image including the plurality of objects. The refocusable image includes images corresponding to objects captured at a certain zoom level.

In operation S1604, the image processing apparatus 100 may detect a gesture on a certain object among the plurality of objects. The image processing apparatus 100 may control the user input part to detect a gesture on a certain object among the plurality of objects. The user input part according to the present embodiment may include a touch screen, a touch panel, a touch pad, a track ball, a gyro sensor, an acceleration sensor, and the like. The processor 120 may detect and recognize a gesture based on a detection signal of the user input part. According to an embodiment of the present disclosure, an indicia corresponding to at least one object may be displayed so as to focus on the at least one object. According to an embodiment of the present disclosure, the gesture indicates an object within a focus domain. The focus domain is one of a near focus and a far focus. In operation S1606, the image processing apparatus 100 may display an image corresponding to an object within the refocusable image. The processor 120 may determine at least one focusable point in the object based on the gesture and control the image capturer 110 to focus on an object in at least one image based on the at least one focusable point.

Figure 17:
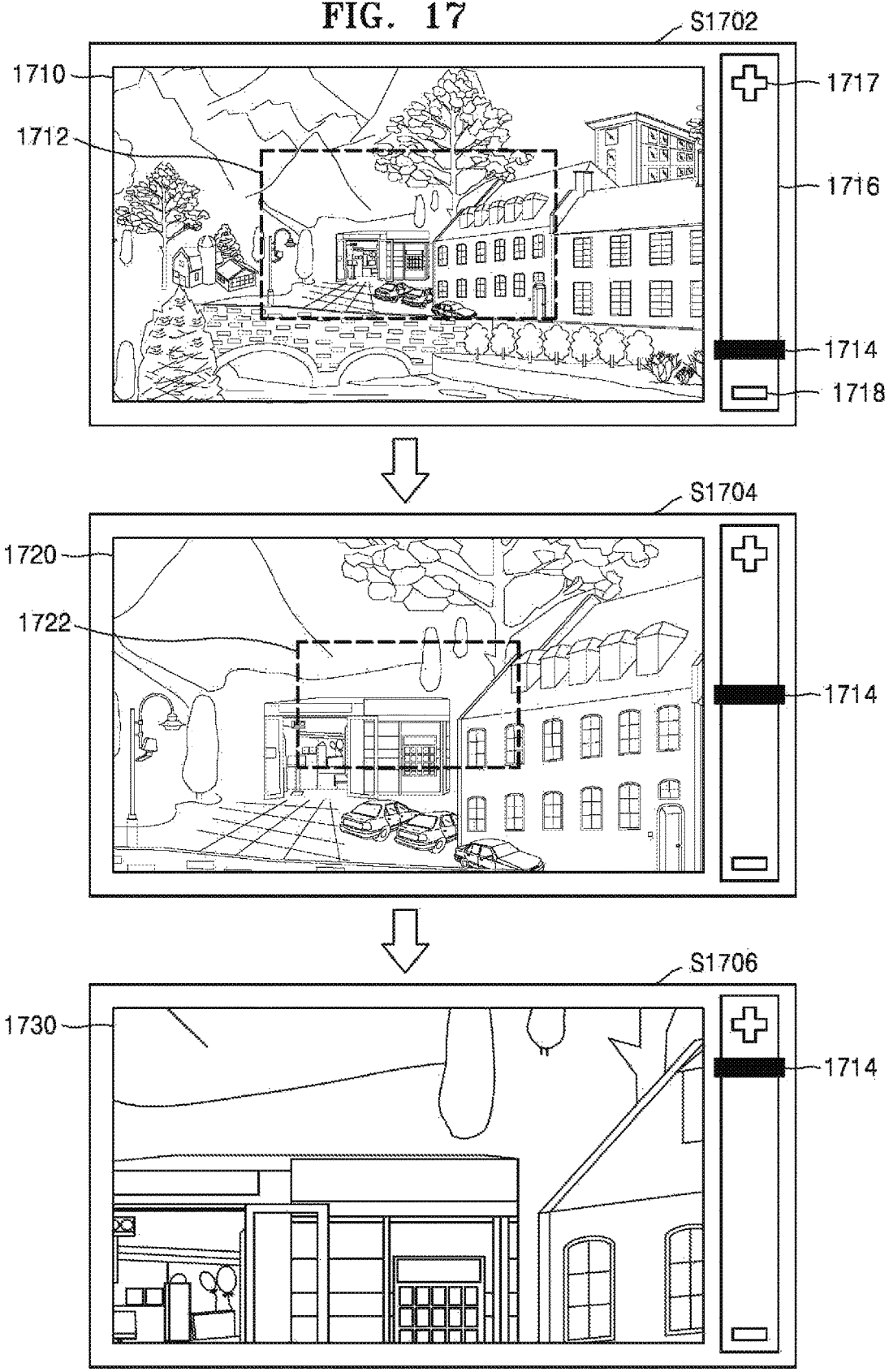
FIG. 17 is a diagram for describing a method of displaying a refocusable image according to an embodiment of the present disclosure.

FIG. 17 is a diagram for describing a method of displaying a refocusable image according to an embodiment of the present disclosure.

Referring to FIG. 17, when a refocusable image is displayed, the user may select a desired zoom level by moving a selection icon 1714 that allows the user to select a zoom level on a scrollbar 1716. According to an embodiment of the present disclosure, the scrollbar 1716 corresponding to an entire range of a changeable zoom level is displayed, and the user can easily grasp to which zoom level the currently displayed image corresponds among the entire expressible zoom levels by moving the selection icon 1714 on the scrollbar 1716.

In operation S1702, the image processing apparatus 100 may display a first image 1710 having a first zoom level. The first image 1710 having the first zoom level is an image corresponding to a zoom level set by the selection icon 1714. According to an embodiment of the present disclosure, when zoom-in is performed in the first image 1710 having the first zoom level, a box 1712 indicating an area on which the zoom-in is performed may be displayed. In operation S1704, when a user input of moving the selection icon 1714 in a zoom-in direction, that is, toward a first icon 1717, a second image 1720 that is zoomed in on an area corresponding to the area of the box 1712 and has a second zoom level is displayed. When a third image that is further zoomed in from the second zoom level is present, the image processing apparatus 100 displays a box 1722 corresponding to an FOV of the third image on the second image 1720. In operation S1706, when the zoom-in is further performed according to a user input, a third image 1730 that corresponds to the area of the box 1722 and has a third zoom level is displayed.

In addition, an image having a lower zoom level than the currently displayed image may be displayed when the user moves the selection icon 1714 in a zoom-out direction, that is, toward a second icon 1718.

Figure 18:
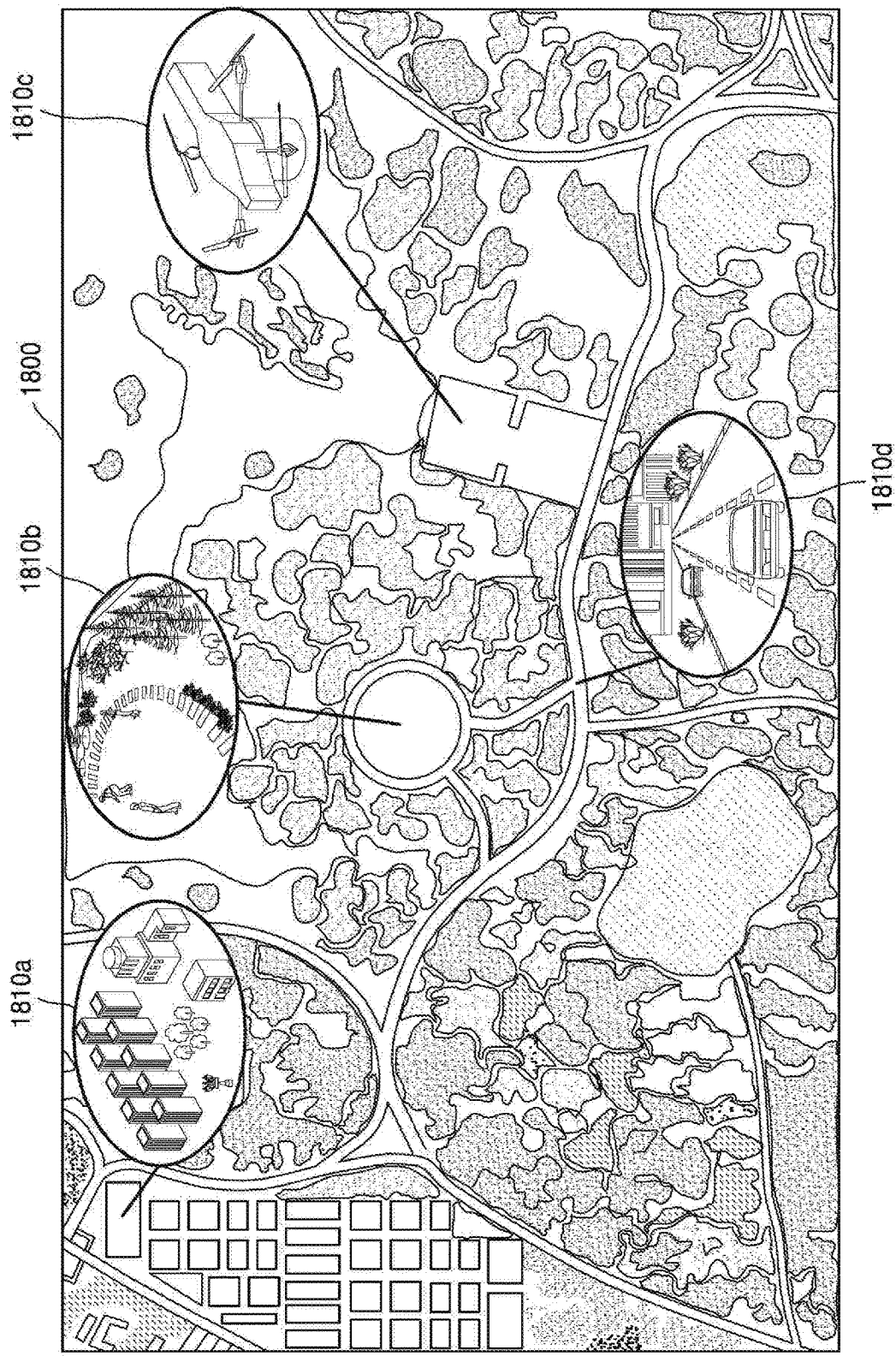
FIG. 18 is a diagram illustrating a refocusable image according to an embodiment of the present disclosure.

FIG. 18 is a diagram illustrating a refocusable image according to an embodiment of the present disclosure.

Referring FIG. 18, images having different zoom levels or different FOVs may be displayed together with a first image 1800 that is a refocusable image. The images having different zoom levels or different FOVs may be displayed in various forms, for example, a form popped up on the first image 1800, a form overlaid on an area corresponding to the first image 1800, or a form displayed on an area separate from the first image 1800.

FIG. 18 illustrates a UI in which images having different zoom levels or different FOVs are displayed on the first image 1800 in a pop-up form. According to an embodiment of the present disclosure, candidate images 1810a, 1810b, 1810c, and 1810d having different FOVs included in the FOV of the first image 1800 are displayed in a pop-up form. When a user selects one of the candidate images 1810a, 1810b, 1810c, and 1810d displayed in the pop-up form, the selected image may be reproduced in a large size.

According to an embodiment of the present disclosure, the image processing apparatus 100 may display the candidate image having a larger FOV than the first image 1800, that is, the candidate image zoomed out from the first image 1800, in a pop-up form or a form displayed on an area separate from the first image 1800. When the user selects the candidate image having a larger FOV than the first image 1800, an image having a larger FOV may be reproduced in a large size.

Figure 19:
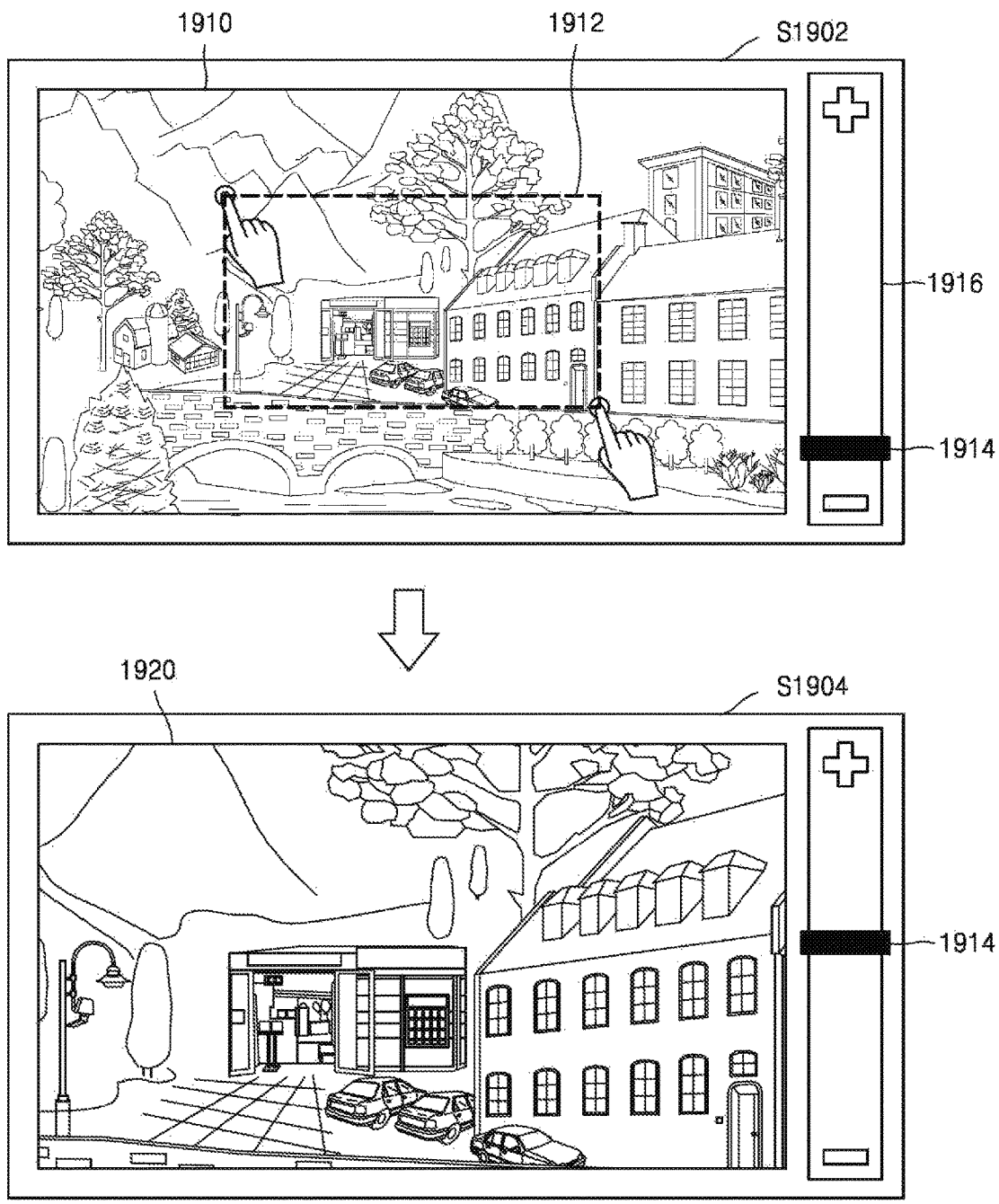
FIG. 19 is a diagram for describing an operation of selecting an ROI according to an embodiment of the present disclosure.

FIG. 19 is a diagram for describing an operation of selecting an ROI according to an embodiment of the present disclosure.

Referring FIG. 19, a user input of selecting an ROI may be input by dragging or hovering.

In operation S1902, a user may set an ROI 1912 by a drag gesture of touching a screen with his/her finger at a first position, dragging his/her finger to a second position, and then releasing his/her finger from the screen. The drag gesture of the user may be detected by using a touch screen, a touch panel, a touch pad, and the like.

According to another embodiment of the present disclosure, the user may set the ROI 1912 by a hovering gesture of dragging from a first position to a second position above a screen, without screen touch or mechanical contact, and then holding. The hovering gesture of the user may be detected by using a proximity sensor, and the like.

In operation S1904, the image processing apparatus 100 may display an image zoomed in on the ROI set by the drag gesture or the hovering gesture. According to an embodiment of the present disclosure, a scrollbar 1916 and an icon 1914 indicating a zoom level corresponding to a currently displayed image 1910 or 1920 may be displayed together with a reproduced image. As illustrated in FIG. 19, when the reproduced image is zoomed in, a position of the icon 1914 may be changed on the scrollbar 1916 according to a changed zoom level.

According to an embodiment of the present disclosure, an UI that changes a zoom level by moving the icon 1914 in the scrollbar 1916 may be provided together with the UI that selects the ROI by dragging, hovering, and the like.

Figure 20:
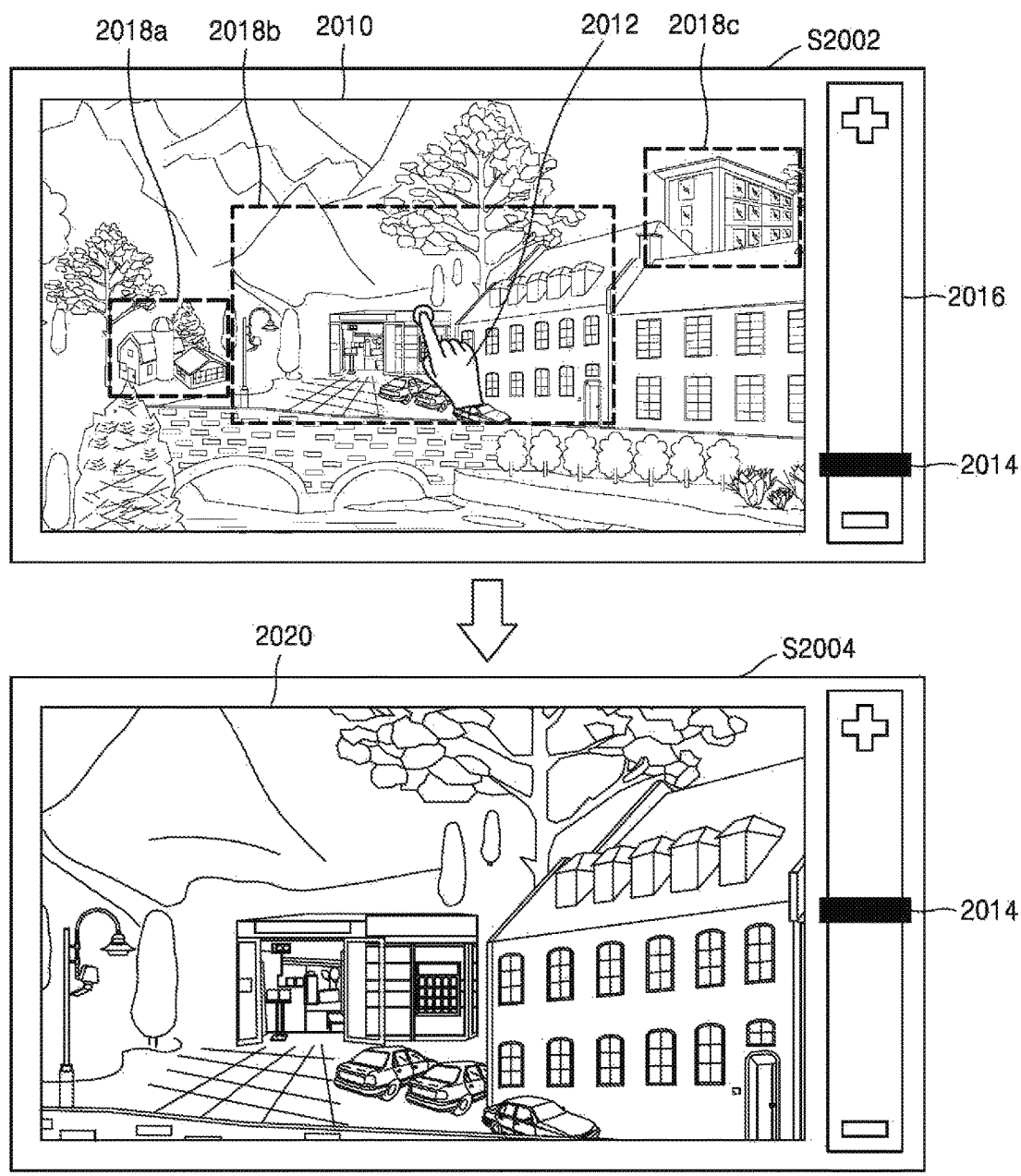
FIG. 20 is a diagram for describing an operation of selecting an ROI according to an embodiment of the present disclosure.

FIG. 20 is a diagram for describing an operation of selecting an ROI according to an embodiment of the present disclosure.

Referring to FIG. 20, the image processing apparatus 100 may display bounding boxes 2018a, 2018b, and 2018c indicating refocusable FOV areas on a reproduced image 2010. The bounding boxes 2018a, 2018b, and 2018c may indicate refocusable FOVs.

In operation S2002, the image processing apparatus 100 may display the bounding boxes 2018a, 2018b, and 2018c indicating selectable FOVs on the first image 2010. In operation S2004, when a user selects one bounding box 2012 among the bounding boxes 2018a, 2018b, and 2018c, a second image 2020 zoomed in on the area corresponding to the selected bounding box 2018b is displayed. When a zoom level of the displayed image is changed, an icon 2014 indicating the changed zoom level may be moved on the scrollbar 2016.

According to an embodiment of the present disclosure, a GUI that changes a zoom level by moving the icon 2014 in the scrollbar 2016 may be provided together with the method of selecting the bounding box.

Figure 21:
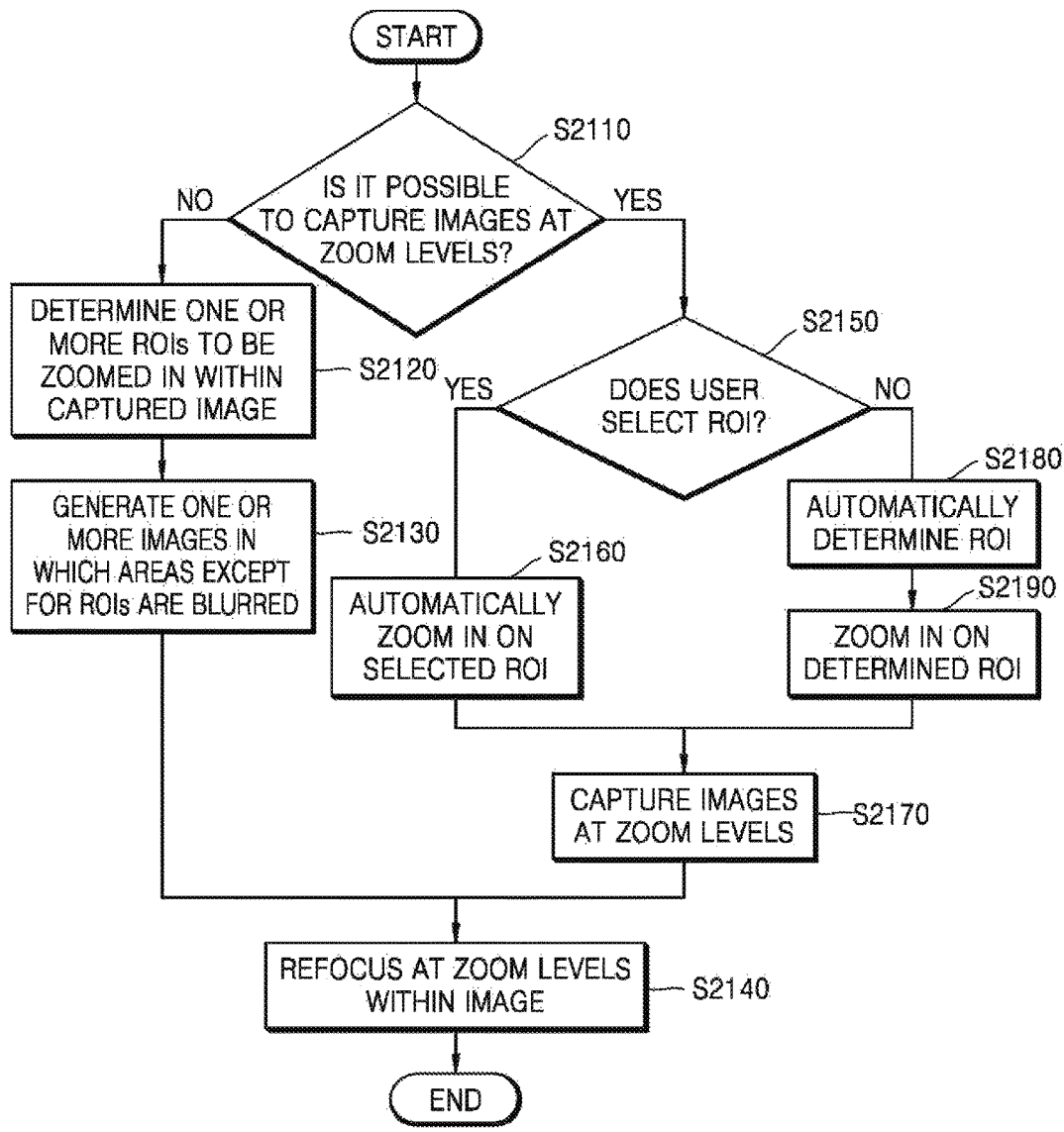
FIG. 21 is a flowchart of an image processing mechanism according to an embodiment of the present disclosure.

FIG. 21 is a flowchart of an image processing mechanism according to an embodiment of the present disclosure.

Referring to FIG. 21, in operation S2110, it may be determined whether it is possible to capture a plurality of images at a plurality of zoom levels. It is possible to capture the plurality of images at the plurality of zoom levels when at least one object is detected from an input image, when at least one high activity area is detected from the input image, or when a face is detected from the input image.

In operation S2120, when it is impossible to capture the plurality of images at the plurality of zoom levels, the image processing apparatus 100 may determine one or more ROIs to be zoomed in within a previously captured image as post-processing. The one or more ROIs may be determined by a user's selection, or may be automatically determined by detecting a change in a focus value.

In operation S2130, the image processing apparatus 100 may generate one or more images in which areas except for the ROIs are blurred.

In operation S2140, the image processing apparatus 100 may display an image having a refocusable form with respect to at least one ROI at a plurality of zoom levels within an image.

In operation S2150, the image processing apparatus 100 may determine whether the user selects the ROI.

In operation S2160, when the user selects the ROI, the image processing apparatus 100 may automatically zoom in on the ROI selected by the user. The embodiments described with reference to FIGS. 19 and 20 may be used for the method of selecting the ROI.

In operation S2170, the image processing apparatus 100 may capture images at a plurality of zoom levels.

In operation S2180, when the user does not select the ROI, the image processing apparatus 100 may automatically determine the ROI. The methods described with reference to FIGS. 8 and 9 may be used for the method of automatically determining the ROI.

In operation S2190, when the ROI is determined, the image processing apparatus 100 may zoom in on the automatically determined ROI. In operations S2170 and S2140, the image processing apparatus 100 may capture images at a plurality of zoom levels with respect to the ROIs, and display the images in a refocusable form.

Figure 22:
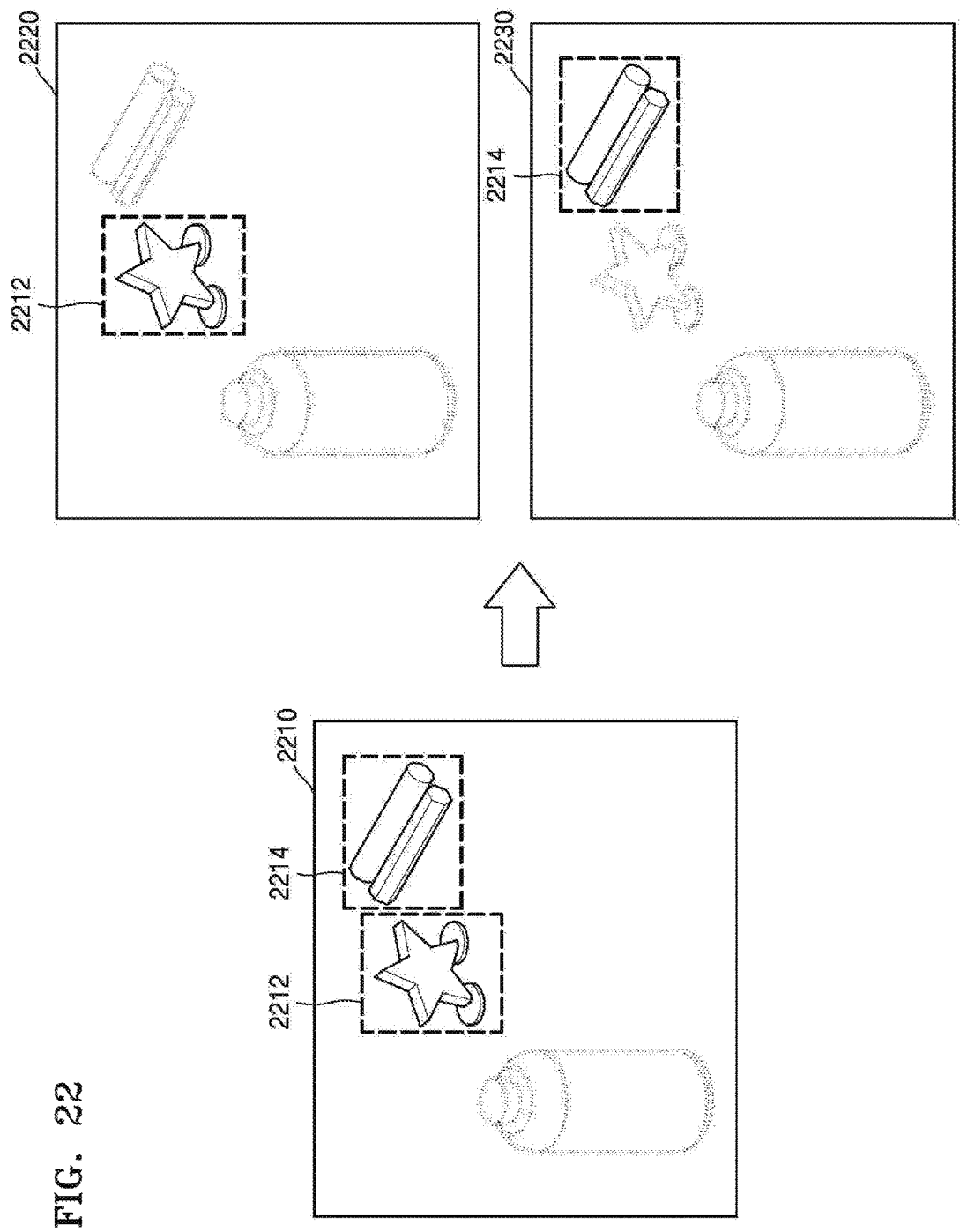
FIG. 22 is a diagram for describing a post-processing method according to an embodiment of the present disclosure.

FIG. 22 is a diagram for describing a post-processing method according to an embodiment of the present disclosure.

Referring FIG. 22, a refocusable image may be generated by performing post-processing on captured and stored images. According to an embodiment of the present disclosure, an image 2210 read from the storage 130 is an image including a plurality of objects. ROIs 2212 and 2214 in the image 2210 include in-focus objects. When a user is interested in only some of the in-focus objects, a refocus effect may be obtained by blurring the other in-focus objects.

For example, the image processing apparatus 100 may generate an image 2220 that is in-focus with the first ROI 2212 by blurring areas except for the first ROI 2212. In addition, the image processing apparatus 100 may generate an image 2230 that is in-focus with the second ROI 2214 by blurring areas except for the second ROI 2214.

Figure 23:
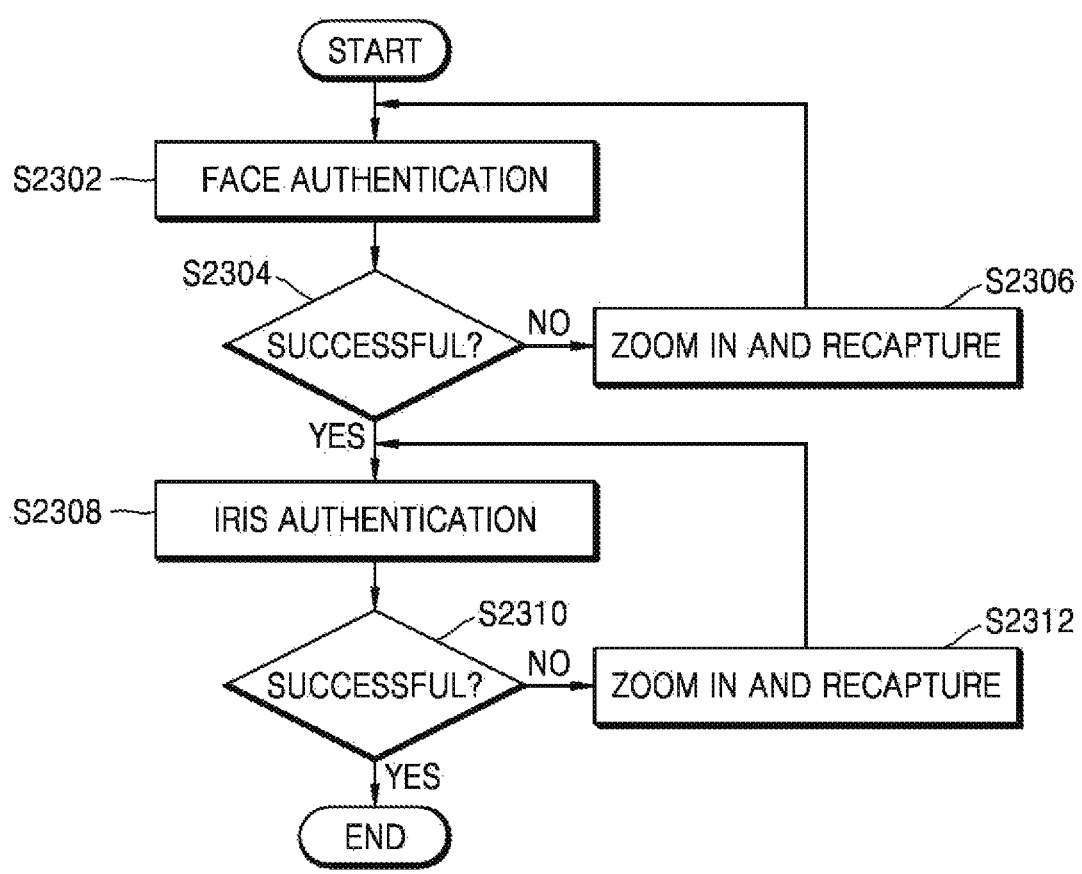
FIG. 23 is a flowchart of a biometric authentication method according to an embodiment of the present disclosure.
Figure 24:
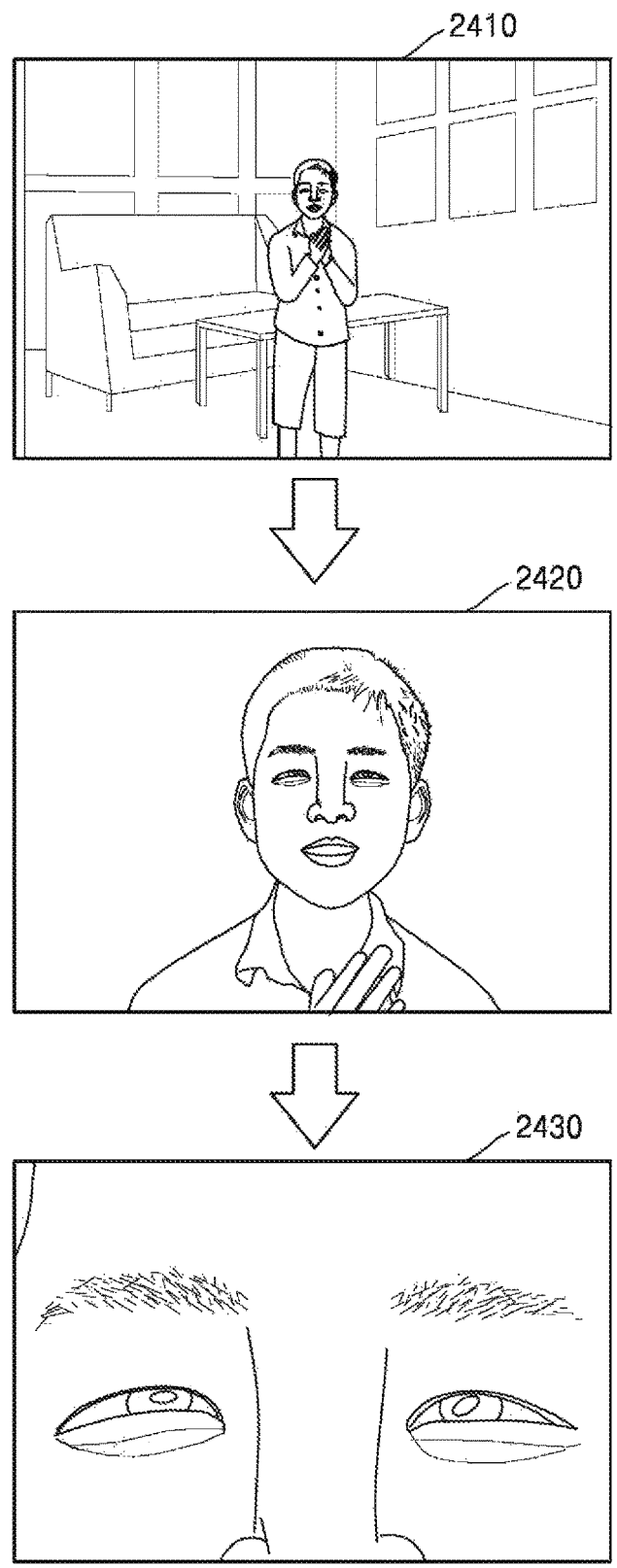
FIG. 24 is a diagram for describing a biometric authentication method according to an embodiment of the present disclosure.

FIG. 23 is a flowchart of a biometric authentication method according to an embodiment of the present disclosure. FIG. 24 is a diagram for describing a biometric authentication method according to an embodiment of the present disclosure.

Referring to FIGS. 23 and 24, in operation S2302, the image processing apparatus 100 may attempt a face authentication by using an input image 2410 having a first zoom level.

In operation S2304, the image processing apparatus 100 may determine whether it is possible to perform the face authentication by using an image captured at the first zoom level. For example, when a size of a face area in the image captured at the first zoom level is smaller than a reference value, the image processing apparatus 100 may determine that the face authentication is impossible. As another example, when a face area in the image captured at the first zoom level is out of focus, the image processing apparatus 100 may determine that the face authentication is impossible.

In operation S2306, when the image processing apparatus 100 determines in operation S2304 that the face authentication is failed, the image processing apparatus 100 may recapture the face area by zooming in at an FOV corresponding to the face area. In operation S2302, the image processing apparatus 100 may perform the face authentication again by using a recaptured image 2420. According to an embodiment of the present disclosure, the image processing apparatus 100 may refocus on the face area by using the refocusable image and perform the face authentication from the refocused image.

In operation S2308, when the image processing apparatus 100 determines in operation S2304 that the face authentication is successful, the image processing apparatus 100 may perform an iris authentication by using an input image. In operation 52312, when the image processing apparatus 100 determines in operation S2310 that the iris authentication is failed, the image processing apparatus 100 may recapture an eye area of a face at an FOV corresponding to the eye area of the face. In operation S2308, the image processing apparatus 100 may perform the iris authentication again by using a recaptured image 2430. According to an embodiment of the present disclosure, the image processing apparatus 100 may refocus on the eye area by using the refocusable image and perform the iris authentication from the refocused image.

Figure 25:
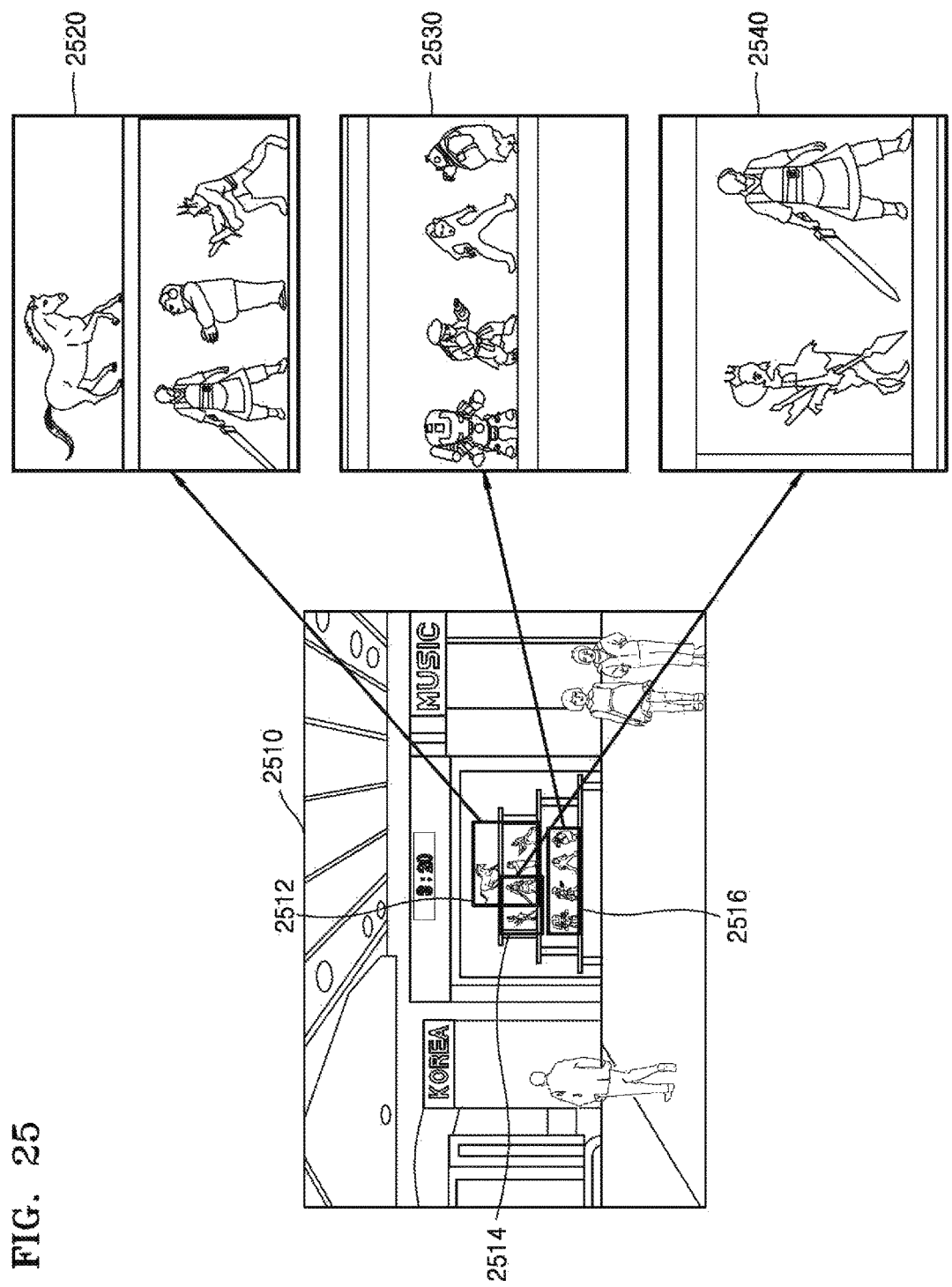
FIG. 25 is a diagram for describing a method of providing a giga pixel photography image according to an embodiment of the present disclosure.

FIG. 25 is a diagram for describing a method of providing a giga pixel photography image according to an embodiment of the present disclosure.

Referring to FIG. 25, the image processing apparatus 100 may provide a giga pixel photography function by additionally capturing and storing an image that is zoomed in with respect to an ROI having high complexity in an image. The area having high complexity may be defined as an area including one or more objects, an area where at least a certain number of edges are present, an area where a text is present, or an area having a great change in a focus value. The image processing apparatus 100 may automatically detect the ROI having high complexity and may zoom in and capture images so as to obtain a refocus effect at a plurality of zoom levels. According to an embodiment of the present disclosure, the image processing apparatus 100 may automatically detect areas having high complexity as ROIs 2512, 2514, and 2516. The image processing apparatus 100 may zoom in and capture images of the detected ROIs 2512, 2514, and 2516 at a plurality of zoom levels. A second image 2520 is an image captured by zooming in with respect to the ROI 2512 of a first image 2510. A third image 2530 is an image captured by zooming in with respect to the ROI 2514 of the first image 2510. A fourth image 2540 is an image captured by zooming in with respect to the ROI 2516 of the first image 2510. The image processing apparatus 100 may store the first image 2510, the second image 2520, the third image 2530, and the fourth image 2540 as a group of refocusable images.

According to an embodiment of the present disclosure, when the first image 2510 is reproduced, the image processing apparatus 100 may display an area selected by the user with a high resolution. When the user selects an area having low complexity, the image processing apparatus 100 may enlarge and display the selected area. When the user selects an area having high complexity, the image processing apparatus 100 may display another image captured by zooming in on the selected area. According to an embodiment of the present disclosure, the image processing apparatus 100 may display a high-resolution image even for an area having high complexity, without any image distortion.

Figure 26:
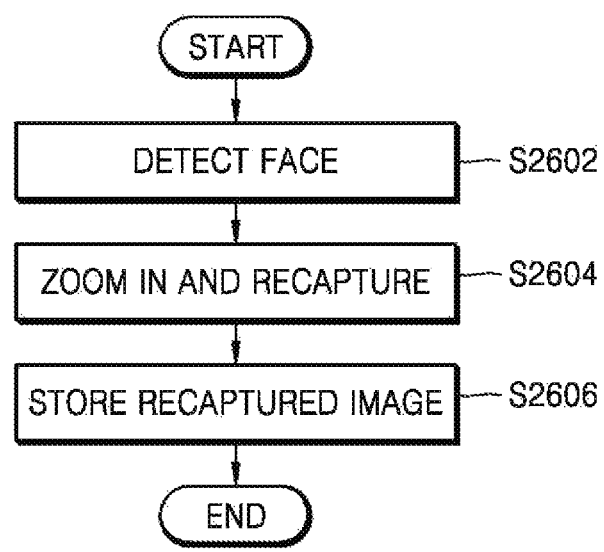
FIG. 26 is a flowchart of an image processing method according to an embodiment of the present disclosure.
Figure 27:
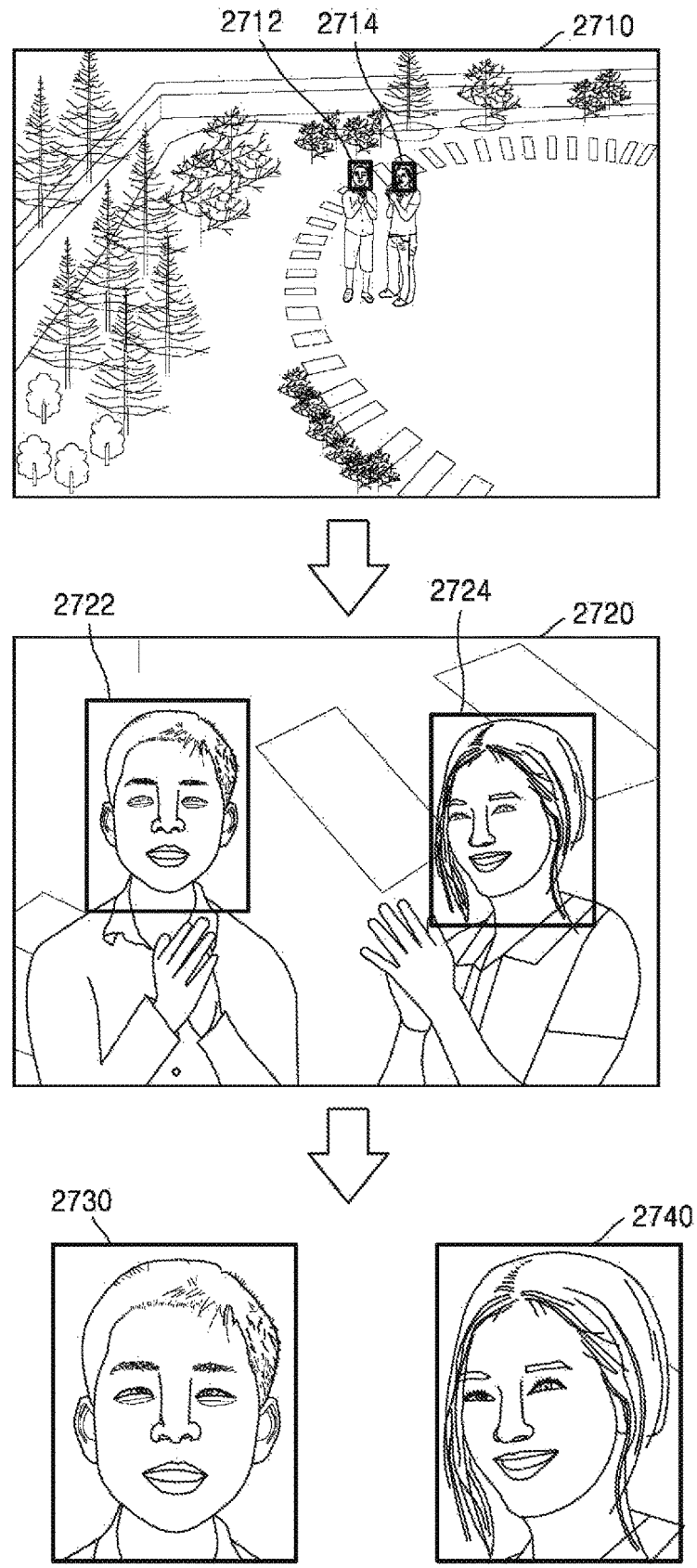
FIG. 27 is a diagram for describing an operation of capturing an image of a face area according to an embodiment of the present disclosure.

FIG. 26 is a flowchart of an image processing method according to an embodiment of the present disclosure. FIG. 27 is a diagram for describing an operation of capturing an image of a face area according to an embodiment of the present disclosure.

Referring to FIGS. 26 and 27, the image processing apparatus 100 may further store an image captured by zooming in on the face area and provide a refocusable image to the face area. According to an embodiment of the present disclosure, the image processing apparatus 100 may be used to detect or recognize a face in a surveillance camera.

In operation S2602, the image processing apparatus 100 may detect face areas 2712 and 2714 from an input image 2710. The processor 120 may detect faces from the input image 2710 by using various face detection algorithms.

In operation S2604, when the face areas 2712 and 2714 are detected from the input image 2710, the image processing apparatus 100 may zoom in and recapture the face areas 2712 and 2714 as illustrated in a recaptured image 2720. In operation S2606, the image processing apparatus 100 may store the zoomed-in and recaptured images 2722 and 2724 in the storage 130.

Operations S2602 and S2604 may be repeated until the faces are sufficiently recognizable.

When a plurality of face areas 2722 and 2724 are included in the recaptured images 2722 and 2724, the image processing apparatus 100 may zoom in on the face areas 2712 and 2714, additionally capture a plurality of images 2730 and 2740 with respect to the face areas 2722 and 2724, and store the captured images 2730 and 2740.

Figure 28:
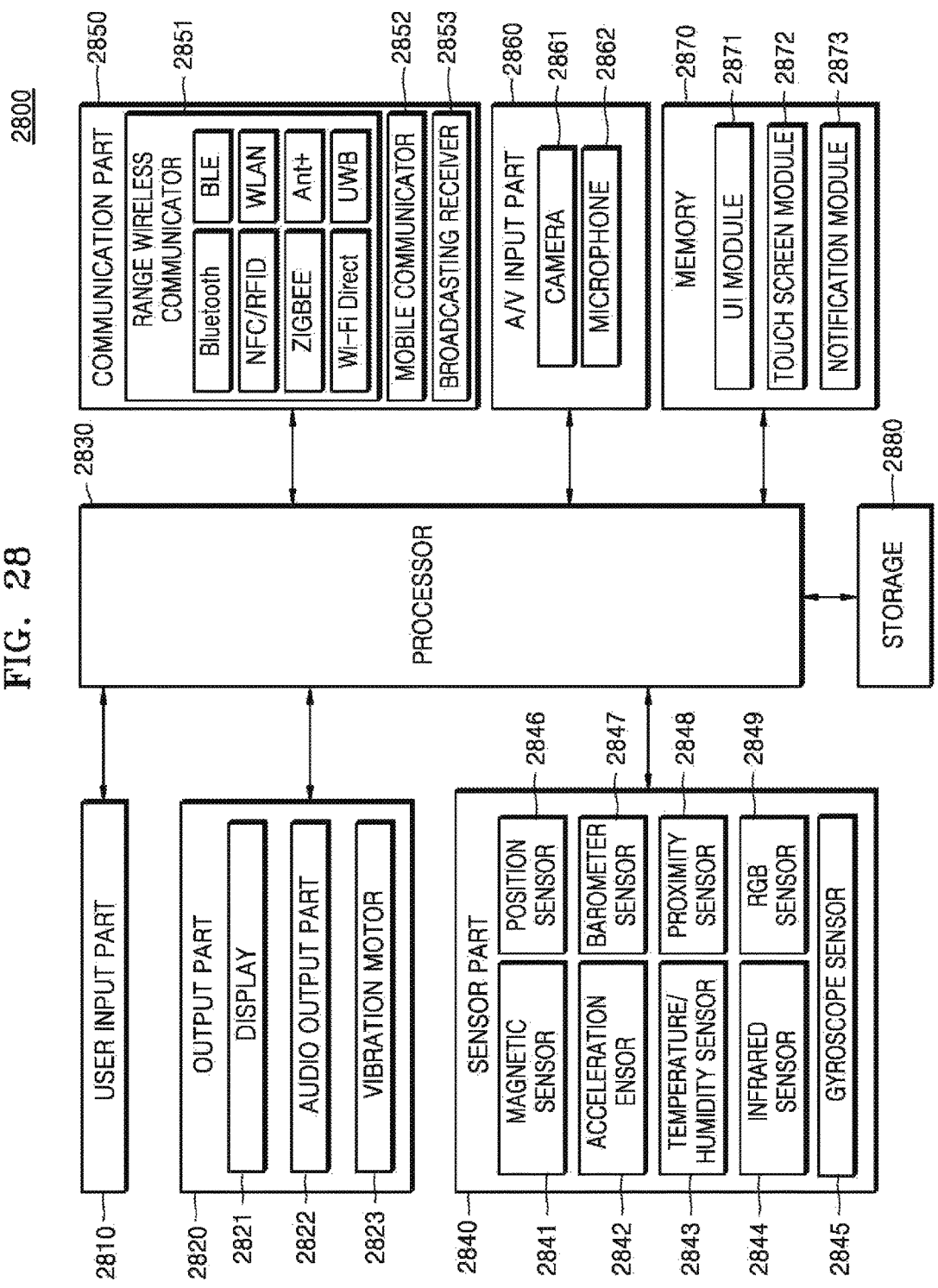
FIG. 28 is a block diagram of an image processing apparatus according to an embodiment of the present disclosure.

FIG. 28 is a block diagram of an image processing apparatus according to an embodiment of the present disclosure.

Referring to FIG. 28, an image processing apparatus 2800 according to the present embodiment may include a user input part 2810, an output part 2820, a processor 2830, a sensor part 2840, a communication part 2850, an audio/video (A/V) input part 2860, a memory 2870, and a storage 2880. However, all elements illustrated in FIG. 28 are not essential to the image processing apparatus 2800. The image processing apparatus 2800 may be implemented with a larger number of elements than illustrated in FIG. 28, or may be implemented with a smaller number of elements than illustrated in FIG. 28. Since the image processing apparatus 2800 illustrated in FIG. 28 corresponds to the image processing apparatus 100 illustrated in FIG. 1, redundant descriptions thereof will not be repeated.

The user input part 2810 may correspond to the user input part (not illustrated) of the image processing apparatus 100.

The output part 2820 may output an audio signal, a video signal, or a vibration signal. The output part 2820 may include a display 2821, an audio output part 2822, and a vibration motor 2823.

The display 2821 may display information processed by the image processing apparatus 2800. For example, the display 2821 may display a bounding box UI for selecting an ROI in a live view mode, a user guide, a captured image, and the like. The display 2821 may correspond to the display 140 of FIG. 1.

On the other hand, in a case where the display 2821 and a touch pad form a layered structure to constitute a touch screen, the display 2821 may also be used as an input device as well as an output part. The display 2821 may include at least one selected from among an LCD, a thin-film transistor-liquid crystal display (TFT-LCD), an organic light-emitting diode (OLED), a flexible display, a three dimensional (3D) display, and an electrophoretic display. According to various embodiments, the image processing apparatus 2800 may include two or more displays 2821. The two or more displays 2821 may be arranged to face each other by using a hinge.

The audio output part 2822 may output audio data received from the communication part 2850 or audio data stored in the memory 2870. In addition, the audio output part 2822 may output an audio signal related to functions performed by the image processing apparatus 2800, such as a call signal reception sound, a message reception sound, and a notification sound. The audio output part 2822 may include a speaker, a buzzer, and the like.

The vibration motor 2823 may output a vibration signal. For example, the vibration motor 2823 may output a vibration signal corresponding to an output of audio data or video data (for example, a call signal reception sound, a message reception sound, and the like). In addition, the vibration motor 2823 may output a vibration signal when a touch screen is touched.

The processor 2830 may control an overall operation of the image processing apparatus 2800. The processor 2830 may include one or more processors and a storage space (for example, a cache memory, a register, and the like). For example, the processor 2830 may control the user input part 2810, the output part 2820, the sensor part 2840, the communication part 2850, and the A/V input part 2860 by executing programs stored in the memory 2870.

Specifically, the processor 2830 may correspond to the processor 120 of FIG. 1.

The sensor part 2840 may detect a state of the image processing apparatus 2800 or a state around the image processing apparatus 2800 and transfer sensed information to the processor 2830.

The sensor part 2840 may include at least one selected from among a magnetic sensor 2841, an acceleration sensor 2842, a temperature/humidity sensor 2843, an infrared sensor 2844, a gyroscope sensor 2845, a position sensor (e.g., global positioning system (GPS)) 2846, a barometer sensor 2847, a proximity sensor 2848, and an RGB sensor (illuminance sensor) 2849, but is not limited thereto. Since the functions of the respective sensors may be intuitively inferred from their names, descriptions thereof will be omitted.

The communication part 2850 may include one or more elements for communication between the image processing apparatus 2800 and a server (not illustrated) or communication between the image processing apparatus 2800 and an external device (not illustrated). For example, the communication part 2850 may include a short-range wireless communicator 2851, a mobile communicator 2852, and a broadcasting receiver 2853.

The short-range wireless communicator 2851 may include a Bluetooth communicator, a Bluetooth low energy (BLE) communicator, a near field communicator, a wireless local access network (WLAN) wireless fidelity (Wi-Fi) communicator, a Zigbee communicator, an infrared data association (IrDA) communicator, a Wi-Fi direction (WFD) communicator, an ultra-wideband (UWB) communicator, or an Ant+ communicator, but is not limited thereto.

The mobile communicator 2852 may transmit and receive a wireless signal with at least one selected from among a base station, an external terminal, and a server via a mobile communication network. The wireless signal may include a voice call signal, a video call signal, or various types of data according to text or multimedia message transmission and reception.

The broadcasting receiver 2853 may receive broadcasting signals and/or broadcasting-related information from the outside via a broadcasting channel. The broadcasting channel may include a satellite channel and a terrestrial channel According to various embodiments of the present disclosure, the image processing apparatus 2800 may not include the broadcasting receiver 2853.

The communication part 2850 may transmit and receive necessary information with the server (not illustrated) and the external device (not illustrated).

The A/V input part 2860 may input audio or video signals and may include a camera 2861 and a microphone 2862. The camera 2861 may acquire an image frame, such as a still image or a moving image, through an image sensor in a video call mode or a photographing mode. An image captured by the image sensor may be processed by the processor 2830 or a separate image processor (not illustrated).

The image frame processed by the camera 2861 may be stored in the memory 2870 or may be transmitted to the outside through the communication part 2850. The camera 2861 may include two or more cameras according to a configuration type of a terminal.

Since the camera 2861 corresponds to the image capturer 110, descriptions thereof will be omitted.

The microphone 2862 may receive external audio signals and process the external audio signals into electrical voice data. For example, the microphone 2862 may receive audio signals from an external device or a person who speaks. The microphone 2862 may use various noise removal algorithms for removing noise generated in the process of receiving external audio signals.

The memory 2870 may store a program for processing and control of the processor 2830, and may store data input to the image processing apparatus 2800 or data output from the image processing apparatus 2800.

The memory 2870 may include at least one storage medium selected from among a flash memory, a hard disk, a multimedia card micro type memory, a card type memory (e.g., SD or XD memory), random access memory (RAM), static random access memory (SRAM), read-only memory (ROM), electrically erasable programmable ROM (EEPROM), programmable ROM (PROM), a magnetic memory, a magnetic disk, and an optical disk.

The programs stored in the memory 2870 may be classified into a plurality of modules according to functions thereof. For example, the programs may be classified into a UI module 2871, a touch screen module 2872, and a notification module 2873.

The UI module 2871 may provide a specialized UI or GUI that interworks with the image processing apparatus 2800 according to each application. The touch screen module 2872 may detect a user's touch gesture on a touch screen and transmit information about the touch gesture to the processor 2830. According to some embodiments of the present disclosure, the touch screen module 2872 may recognize and analyze a touch code. The touch screen module 2872 may include separate hardware including a controller.

Various sensors may be provided inside or near the touch screen so as to detect a touch on the touch screen or hovering above the touch screen. An example of the sensor that detects the touch on the touch screen may be a tactile sensor. The tactile sensor may detect a contact of a specific object at or beyond a sensitivity of a person. The tactile sensor may detect a variety of information, such as roughness of a contact surface, hardness of a contact object, a temperature of a contact point, and the like.

In addition, an example of the sensor that detects the touch on the touch screen may be a proximity sensor.

The proximity sensor may detect the presence or absence of an object approaching a certain detection surface or an object existing nearby by using a force of an electromagnetic field or infrared light, without any mechanical contact. Examples of the proximity sensor may include a transmission-type photoelectric sensor, a direct reflection-type photoelectric sensor, a mirror reflection-type photoelectric sensor, a radio frequency oscillation-type proximity sensor, an electrostatic capacitance-type proximity sensor, a magnetic-type proximity sensor, and an infrared proximity sensor.

The notification module 2873 may generate a signal for notifying the user of an occurrence of an event in the image processing apparatus 2800. Examples of the event occurring in the image processing apparatus 2800 may include a call signal reception, a message reception, a key signal input, and a schedule notification. The notification module 2873 may output a notification signal through the display 2821 in the form of a video signal. The notification module 2873 may output a notification signal through the audio output part 2822 in the form of an audio signal. The notification module 2873 may output a notification signal through a vibration motor 8353 in the form of a vibration signal.

The storage 2880 may correspond to the storage 130 of FIG. 1.

Figure 29:
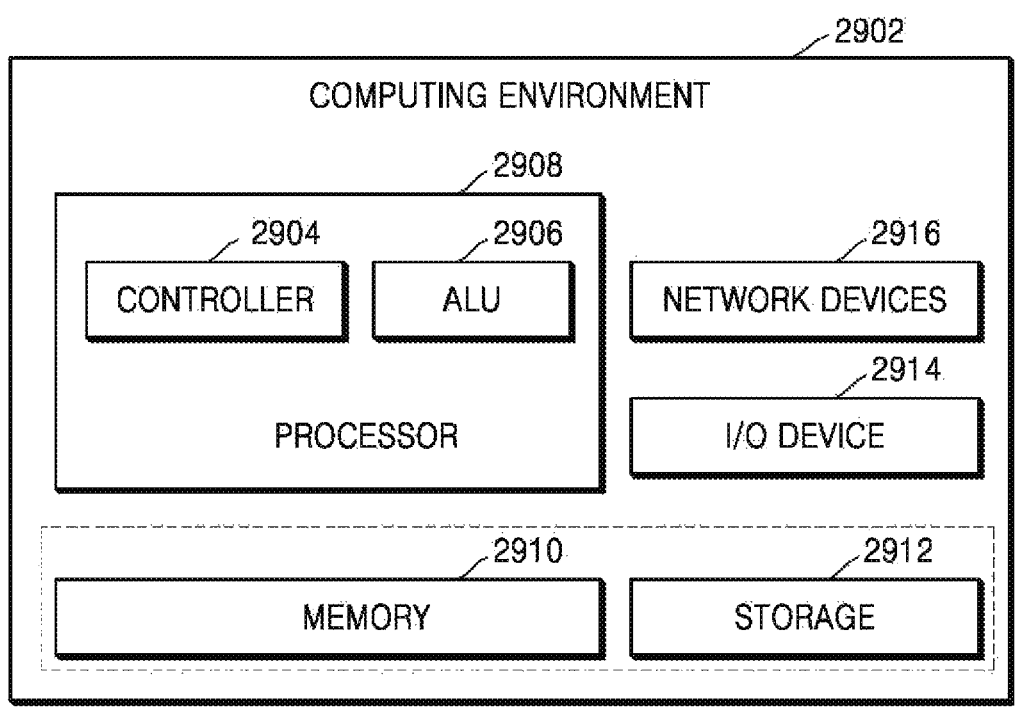
FIG. 29 is a block diagram of a computing environment that performs a method and a system for capturing a plurality of images in an electronic device according to an embodiment of the present disclosure.

FIG. 29 is a block diagram of a computing environment that performs a method and a system for capturing a plurality of images in an electronic device according to an embodiment of the present disclosure.

Referring to FIG. 29, a computing environment 2902 may include at least one processor 2908 including a controller 2904 and an arithmetic logic unit (ALU) 2906, a memory 2910, a storage 2912, a plurality of network devices 2916, and an input/output (I/O) device 2914. The processor 2908 may process a command of a scheme. The processor 2908 may receive a command from the controller 2904 so as to perform the processing of the controller 2904. In addition, logic and arithmetic operations related to an execution of a command may be performed through the ALU 2906.

The computing environment 2902 may include a plurality of homogeneous or heterogeneous cores, different types of central processing units (CPUs), specific media, and other accelerators. The processor 2908 may process a command of a scheme. In addition, the plurality of processors 2908 may be arranged over one chip, or may be arranged over multiple chips.

The scheme may include commands and codes required for implementation. The scheme may be stored in either or both of the memory 2910 or the storage 2912. When a command is executed, the command may be read from the memory 2910 or the storage 2912 and be executed by the processor 2908.

In the case of hardware implementation, the network devices 2916 or the external I/O device 2914 may be connected to the computing environment 2902 to support implementation through a network interface and an I/O device.

According to various embodiments of the present disclosure, it is possible to provide a refocusable image by capturing a plurality of images at a plurality of zoom levels, without special sensors, such as a light field sensor.

According to various embodiments of the present disclosure, it is possible to improve a focus resolution with respect to objects that seem to be present on the same focal plane because the objects are placed at a long distance.

Furthermore, according to various embodiments of the present disclosure, it is possible to refocus on objects that are present on the same focal plane.

Embodiments may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media. Furthermore, the non-transitory computer-readable recording medium may include any computer storage medium and communication medium. The computer storage medium may include any volatile and non-volatile media or any removable and non-removable media embodied by a certain method or technology for storing information, such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image processing apparatus comprising:
   an image capturer configured to capture a plurality of images having different zoom levels;
   a storage configured to store the plurality of images;
   a display configured to display a first image among the plurality of images; and
   a processor configured to:
   control the image capturer to capture at least one image of at least one subject in the first image, the at least one image being captured with a higher zoom level than a zoom level of the first image and with focusing on the at least one subject,
   store the at least one image in the storage, and
   control the display to display, when a subject among the at least one subject in the first image is selected, the image of the at least one subject,
   wherein the processor is further configured to control the image capturer to capture each of the at least one image with focusing on each of the at least one subject so that the at least one image is captured with a different focus on each of the at least one subject.

2. The image processing apparatus of claim 1, wherein the processor is further configured to control the image capturer to capture the plurality of images having different zoom levels, the plurality of images including a region of interest (ROI) determined by a control signal input to the processor.

3. The image processing apparatus of claim 1, wherein the processor is further configured to:
   set at least one region of interest (ROI) based on a focus value of an input image captured by the image capturer, and
   control the image capturer to zoom in on the at least one ROI and capture at least one image with respect to the at least one ROI.

4. The image processing apparatus of claim 1, wherein the processor is further configured to:
   detect a plurality of objects concluded as a same focal plane from an input image captured by the image capturer, and
   control the image capturer to zoom in at a first zoom level with respect to an area including the plurality of objects, sequentially focus on the plurality of objects at the first zoom level, and capture a plurality of images having different focuses.

5. The image processing apparatus of claim 1, wherein the processor is further configured to:
   determine a region of interest (ROI) and output guide information that adjusts a field of view (FOV), and
   place the ROI at a center of the FOV.

6. The image processing apparatus of claim 1, wherein the display is further configured to display the plurality of images having different zoom levels.

7. The image processing apparatus of claim 6, wherein the display is further configured to:
   display the first image having a first zoom level, and
   overlay, on the first image, at least one image having different zoom levels on at least one region of interest (ROI) included in the first image.

8. The image processing apparatus of claim 1, wherein the processor is further configured to control the display to display, on the first image, a mark indicating a field of view (FOV) of an image having a zoom level different from the zoom level of the first image while the first image is displayed.

9. The image processing apparatus of claim 1, wherein the display is further configured to display, on the first image, a mark indicating information about an image having a focus different from a focus of the first image while the first image is displayed.

10. The image processing apparatus of claim 1, wherein the storage is further configured to:
    store identification information of the plurality of images having the different zoom levels, and
    store at least one selected from among zoom level information, field of view (FOV) information, and focus information of the plurality of images having the different zoom levels.

11. An image processing method comprising:
    capturing a plurality of images including a first image and at least one image of at least one subject in the first image, the at least one image being captured with a higher zoom level than a zoom level of the first image and with focusing on the at least one subject;

displaying the first image; and displaying, when a subject among the at least one subject in the first image is selected, the image of the at least one subject, wherein the capturing of the plurality of images comprises capturing each of the at least one image with focusing on each of the at least one subject so that the at least one image is captured with a different focus on each of the at least one subject.

12. The image processing method of claim 11, wherein the capturing of the plurality of images comprises capturing the plurality of images having different zoom levels with respect to a region of interest (ROI) determined by an input control signal.

13. The image processing method of claim 11, further comprising:

setting at least one region of interest (ROI) based on a focus value of an input image, wherein the capturing of the plurality of images comprises zooming in on the at least one ROI and capturing at least one image with respect to the at least one ROI.

14. The image processing method of claim 11, further comprising:

detecting a plurality of objects concluded as a same focal plane from an input image, wherein the capturing of the plurality of images comprises:

zooming in at a first zoom level with respect to an area including the plurality of objects; and sequentially focusing on the plurality of objects at the first zoom level and capturing a plurality of images having different focuses.

15. The image processing method of claim 11, further comprising:

determining a region of interest (ROI); and outputting guide information that adjusts a field of view (FOV) and placing the ROI at a central portion of the FOV.

16. The image processing method of claim 11, further comprising:

displaying the plurality of images having different zoom levels.

17. An image processing apparatus comprising:

an image capturer configured to capture a plurality of images having different zoom levels with focusing on a subject;

a processor configured to generate an image file including refocus information and image data with respect to each of the plurality of images; and a storage configured to store the image file, wherein the refocus information comprises information indicating that the corresponding image file is a refocusable image, and a path of a file to be referred for refocus processing.

18. An image processing apparatus comprising:

a storage configured to store a plurality of images having different zoom levels with focusing on a subject and refocus information;

a display configured to display a first image among the plurality of images; and a processor configured to control, when a control input is received, the display to display a second image based on the refocus information, the second image having a zoom level different from a zoom level of the first image among the plurality of images, wherein the refocus information comprises information indicating that the corresponding image file is a refocusable image, and a path of a file to be referred for refocus processing.

* * * * *